(12) United States Patent
Sawyer et al.

(10) Patent No.: US 10,110,656 B2
(45) Date of Patent: Oct. 23, 2018

(54) SYSTEMS AND METHODS FOR PROVIDING SHELL COMMUNICATION IN A CLOUD-BASED PLATFORM

(71) Applicant: Box, Inc., Redwood City, CA (US)

(72) Inventors: David Sawyer, Mountain View, CA (US); Kunal Parmar, San Jose, CA (US)

(73) Assignee: Box, Inc., Los Altos, CA (US)

( * ) Notice: Subject to any disclaimer, the term of this patent is extended or adjusted under 35 U.S.C. 154(b) by 883 days.

(21) Appl. No.: 14/314,677

(22) Filed: Jun. 25, 2014

(65) Prior Publication Data

US 2014/0379586 A1   Dec. 25, 2014

Related U.S. Application Data

(60) Provisional application No. 61/839,331, filed on Jun. 25, 2013.

(51) Int. Cl.
*H04L 29/08* (2006.01)
*G06F 3/0481* (2013.01)
*G06F 17/30* (2006.01)

(52) U.S. Cl.
CPC .......... *H04L 67/00* (2013.01); *G06F 3/04817* (2013.01); *G06F 17/30126* (2013.01); *G06F 17/30171* (2013.01); *H04L 67/1095* (2013.01)

(58) Field of Classification Search
None
See application file for complete search history.

(56) References Cited

U.S. PATENT DOCUMENTS

| | | | | |
|---|---|---|---|---|
| 5,191,645 A | * | 3/1993 | Carlucci | G11B 27/024 345/581 |
| 5,799,320 A | | 8/1998 | Klug | |
| 5,848,415 A | | 12/1998 | Guck | |
| 5,864,870 A | | 1/1999 | Guck | |

(Continued)

FOREIGN PATENT DOCUMENTS

| | | |
|---|---|---|
| CA | 2724521 | 11/2009 |
| CN | 101997924 A | 3/2011 |

(Continued)

OTHER PUBLICATIONS

"Average Conversion Time for a D60 RAW file?" http://www.dpreview.com, Jul. 22, 2002, 4 pages.

(Continued)

*Primary Examiner* — Syling Yen
*Assistant Examiner* — Soheila (Gina) Davanlou
(74) *Attorney, Agent, or Firm* — Sheridan Ross P.C.

(57) ABSTRACT

Embodiments of the present disclosure include systems and methods for implementing an Iconizer in a cloud-based platform such as cloud based platform (e.g., cloud-based collaboration platform or cloud-based platform providing collaborative and/or file sharing services). The iconizer can facilitate the display on a graphical user interface (GUI) of certain features of the storage operation and synchronization to a user. Some embodiments contemplate methods for representing Unicode text in the file system operations in either Normal Form Composed (NFC) or Normal Form Decomposed (NFD). Various disclosed embodiments facilitate operations using either or both formats, or a combination of the two.

20 Claims, 10 Drawing Sheets

(56) References Cited

U.S. PATENT DOCUMENTS

| | | | |
|---|---|---|---|
| 5,999,908 A | 12/1999 | Abelow | |
| 6,016,467 A | 1/2000 | Newsted et al. | |
| 6,055,543 A | 4/2000 | Christensen et al. | |
| 6,073,161 A | 6/2000 | DeBoskey et al. | |
| 6,098,078 A | 8/2000 | Gehani et al. | |
| 6,233,600 B1 | 5/2001 | Salas et al. | |
| 6,260,040 B1 | 7/2001 | Kauffman et al. | |
| 6,289,345 B1 | 9/2001 | Yasue | |
| 6,292,803 B1 | 9/2001 | Richardson et al. | |
| 6,336,124 B1 | 1/2002 | Alam et al. | |
| 6,342,906 B1 | 1/2002 | Kumar et al. | |
| 6,345,386 B1 | 2/2002 | Delo et al. | |
| 6,370,543 B2 | 4/2002 | Hoffert et al. | |
| 6,385,606 B2 | 5/2002 | Inohara et al. | |
| 6,396,593 B1 | 5/2002 | Laverty et al. | |
| 6,493,804 B1 * | 12/2002 | Soltis | G06F 12/0815 707/999.009 |
| 6,515,681 B1 | 2/2003 | Knight | |
| 6,539,381 B1 | 3/2003 | Prasad et al. | |
| 6,584,466 B1 | 6/2003 | Serbinis et al. | |
| 6,636,872 B1 | 10/2003 | Heath et al. | |
| 6,654,737 B1 | 11/2003 | Nunez | |
| 6,662,186 B1 | 12/2003 | Esquibel et al. | |
| 6,687,878 B1 | 2/2004 | Eintracht et al. | |
| 6,714,968 B1 | 3/2004 | Prust | |
| 6,735,623 B1 | 5/2004 | Prust | |
| 6,742,181 B1 | 5/2004 | Koike et al. | |
| 6,760,721 B1 | 7/2004 | Chasen et al. | |
| 6,947,162 B2 | 9/2005 | Rosenberg et al. | |
| 6,952,724 B2 | 10/2005 | Prust | |
| 6,996,768 B1 | 2/2006 | Elo et al. | |
| 7,010,752 B2 | 3/2006 | Ly | |
| 7,020,697 B1 | 3/2006 | Goodman et al. | |
| 7,039,806 B1 | 5/2006 | Friedman et al. | |
| 7,069,393 B2 | 6/2006 | Miyata et al. | |
| 7,130,831 B2 | 10/2006 | Howard et al. | |
| 7,133,834 B1 | 11/2006 | Abelow | |
| 7,149,787 B1 | 12/2006 | Mutalik et al. | |
| 7,152,182 B2 | 12/2006 | Ji et al. | |
| 7,155,483 B1 | 12/2006 | Friend et al. | |
| 7,165,107 B2 | 1/2007 | Pouyoul et al. | |
| 7,222,078 B2 | 5/2007 | Abelow | |
| 7,275,244 B1 | 9/2007 | Charles Bell et al. | |
| 7,296,025 B2 | 11/2007 | Kung et al. | |
| 7,346,778 B1 | 3/2008 | Guiter et al. | |
| 7,353,252 B1 | 4/2008 | Yang et al. | |
| 7,370,269 B1 | 5/2008 | Prabhu et al. | |
| 7,543,000 B2 | 6/2009 | Castro et al. | |
| 7,581,221 B2 | 8/2009 | Lai et al. | |
| 7,620,565 B2 | 11/2009 | Abelow | |
| 7,647,559 B2 | 1/2010 | Yozell-Epstein et al. | |
| 7,650,367 B2 | 1/2010 | Arruza | |
| 7,661,088 B2 | 2/2010 | Burke | |
| 7,665,093 B2 | 2/2010 | Maybee et al. | |
| 7,676,542 B2 | 3/2010 | Moser et al. | |
| 7,698,363 B2 | 4/2010 | Dan et al. | |
| 7,734,600 B1 | 6/2010 | Wise et al. | |
| 7,756,843 B1 | 7/2010 | Palmer | |
| 7,774,412 B1 | 8/2010 | Schnepel | |
| 7,814,426 B2 | 10/2010 | Huesken et al. | |
| 7,886,287 B1 | 2/2011 | Davda | |
| 7,890,964 B2 | 2/2011 | Vogler-Ivashchanka et al. | |
| 7,937,663 B2 | 5/2011 | Parker et al. | |
| 7,958,453 B1 | 6/2011 | Taing | |
| 7,979,296 B2 | 7/2011 | Kruse et al. | |
| 7,996,374 B1 | 8/2011 | Jones et al. | |
| 8,027,976 B1 | 9/2011 | Ding et al. | |
| RE42,904 E | 11/2011 | Stephens, Jr. | |
| 8,065,739 B1 | 11/2011 | Bruening et al. | |
| 8,090,361 B2 | 1/2012 | Hagan | |
| 8,103,662 B2 | 1/2012 | Eagan et al. | |
| 8,151,183 B2 | 4/2012 | Chen et al. | |
| 8,185,830 B2 | 5/2012 | Saha et al. | |
| 8,214,747 B1 | 7/2012 | Yankovich et al. | |
| 8,230,348 B2 | 7/2012 | Peters et al. | |
| 8,347,276 B2 | 1/2013 | Schadow | |
| 8,358,701 B2 | 1/2013 | Chou et al. | |
| 8,429,540 B1 | 4/2013 | Yankovich et al. | |
| 8,464,161 B2 | 6/2013 | Giles et al. | |
| 8,527,549 B2 | 9/2013 | Cidon | |
| 8,549,066 B1 | 10/2013 | Donahue et al. | |
| 8,549,511 B2 | 10/2013 | Seki et al. | |
| 8,607,306 B1 | 12/2013 | Bridge et al. | |
| 8,849,955 B2 | 9/2014 | Prahlad et al. | |
| 2001/0027492 A1 | 10/2001 | Gupta | |
| 2002/0091738 A1 | 7/2002 | Rohrabaugh et al. | |
| 2002/0099772 A1 | 7/2002 | Deshpande et al. | |
| 2002/0133509 A1 | 9/2002 | Johnston et al. | |
| 2002/0147770 A1 | 10/2002 | Tang | |
| 2002/0194177 A1 | 12/2002 | Sherman et al. | |
| 2003/0041095 A1 | 2/2003 | Konda et al. | |
| 2003/0084306 A1 | 5/2003 | Abburi et al. | |
| 2003/0093404 A1 | 5/2003 | Bader et al. | |
| 2003/0108052 A1 | 6/2003 | Inoue et al. | |
| 2003/0110264 A1 | 6/2003 | Whidby et al. | |
| 2003/0115326 A1 | 6/2003 | Verma et al. | |
| 2003/0135536 A1 | 7/2003 | Lyons | |
| 2003/0135565 A1 | 7/2003 | Estrada | |
| 2003/0154306 A1 | 8/2003 | Perry | |
| 2003/0204490 A1 | 10/2003 | Kasriel | |
| 2003/0217171 A1 | 11/2003 | Von Stuermer et al. | |
| 2004/0021686 A1 | 2/2004 | Barberis | |
| 2004/0088647 A1 | 5/2004 | Miller et al. | |
| 2004/0103147 A1 | 5/2004 | Flesher et al. | |
| 2004/0111415 A1 | 6/2004 | Scardino et al. | |
| 2004/0117438 A1 | 6/2004 | Considine et al. | |
| 2004/0122949 A1 | 6/2004 | Zmudzinski et al. | |
| 2004/0128359 A1 | 7/2004 | Horvitz et al. | |
| 2004/0177138 A1 | 9/2004 | Salle et al. | |
| 2004/0181579 A1 | 9/2004 | Huck et al. | |
| 2004/0230624 A1 | 11/2004 | Frolund et al. | |
| 2004/0246532 A1 | 12/2004 | Inada | |
| 2004/0267836 A1 | 12/2004 | Armangau et al. | |
| 2005/0005276 A1 | 1/2005 | Morgan | |
| 2005/0010860 A1 | 1/2005 | Weiss et al. | |
| 2005/0022229 A1 | 1/2005 | Gabriel et al. | |
| 2005/0028006 A1 | 2/2005 | Leser et al. | |
| 2005/0050228 A1 | 3/2005 | Perham et al. | |
| 2005/0063083 A1 | 3/2005 | Dart et al. | |
| 2005/0097225 A1 | 5/2005 | Glatt et al. | |
| 2005/0102328 A1 | 5/2005 | Ring et al. | |
| 2005/0108406 A1 | 5/2005 | Lee et al. | |
| 2005/0114305 A1 | 5/2005 | Haynes et al. | |
| 2005/0114378 A1 | 5/2005 | Elien et al. | |
| 2005/0182966 A1 | 8/2005 | Pham et al. | |
| 2005/0198299 A1 | 9/2005 | Beck et al. | |
| 2005/0198452 A1 | 9/2005 | Watanabe | |
| 2005/0234864 A1 | 10/2005 | Shapiro | |
| 2005/0234943 A1 | 10/2005 | Clarke | |
| 2005/0261933 A1 | 11/2005 | Magnuson | |
| 2006/0005163 A1 | 1/2006 | Huesken et al. | |
| 2006/0026502 A1 | 2/2006 | Dutta | |
| 2006/0026535 A1 | 2/2006 | Hotelling et al. | |
| 2006/0036568 A1 | 2/2006 | Moore et al. | |
| 2006/0041603 A1 | 2/2006 | Paterson et al. | |
| 2006/0047804 A1 | 3/2006 | Fredricksen et al. | |
| 2006/0053088 A1 | 3/2006 | Ali et al. | |
| 2006/0053380 A1 | 3/2006 | Spataro et al. | |
| 2006/0070083 A1 | 3/2006 | Brunswig et al. | |
| 2006/0075071 A1 | 4/2006 | Gillette | |
| 2006/0123062 A1 | 6/2006 | Bobbitt et al. | |
| 2006/0133340 A1 | 6/2006 | Rybak et al. | |
| 2006/0168550 A1 | 7/2006 | Muller et al. | |
| 2006/0174051 A1 | 8/2006 | Lordi et al. | |
| 2006/0174054 A1 | 8/2006 | Matsuki | |
| 2006/0179070 A1 | 8/2006 | George et al. | |
| 2006/0242209 A1 | 10/2006 | Karas et al. | |
| 2006/0259524 A1 | 11/2006 | Horton | |
| 2006/0265719 A1 | 11/2006 | Astl et al. | |
| 2006/0271510 A1 | 11/2006 | Harward et al. | |
| 2007/0016680 A1 | 1/2007 | Burd et al. | |
| 2007/0038934 A1 | 2/2007 | Fellman | |
| 2007/0079242 A1 | 4/2007 | Jolley et al. | |
| 2007/0115845 A1 | 5/2007 | Hochwarth et al. | |

(56) References Cited

U.S. PATENT DOCUMENTS

| | | |
|---|---|---|
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0044128 A1 | 2/2009 | Baumgarten et al. |
| 2009/0049131 A1 | 2/2009 | Lyle et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0179991 A1* | 7/2010 | Lorch ................ H04M 1/7253 709/206 |
| 2010/0185463 A1 | 7/2010 | Noland et al. |
| 2010/0185932 A1 | 7/2010 | Coffman et al. |
| 2010/0185980 A1* | 7/2010 | Kuo ................ H04M 1/72519 715/810 |
| 2010/0191689 A1 | 7/2010 | Cortes et al. |
| 2010/0198783 A1 | 8/2010 | Wang et al. |
| 2010/0198944 A1 | 8/2010 | Ho et al. |
| 2010/0205537 A1 | 8/2010 | Knighton et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306004 A1* | 12/2010 | Burtner ................ G06Q 10/10 705/301 |
| 2010/0306379 A1 | 12/2010 | Ferris |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |

(56) References Cited

U.S. PATENT DOCUMENTS

| | | |
|---|---|---|
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0113320 A1 | 5/2011 | Neff et al. |
| 2011/0119313 A1 | 5/2011 | Sung et al. |
| 2011/0137991 A1 | 6/2011 | Russell |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0302113 A1* | 12/2011 | Smith ............... G06F 17/30144 706/12 |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0084672 A1* | 4/2012 | Vonog ............... H04L 12/1827 715/756 |
| 2012/0089569 A1* | 4/2012 | Mason, Jr. ........ G06F 17/3023 707/639 |
| 2012/0089659 A1 | 4/2012 | Halevi et al. |
| 2012/0110005 A1 | 5/2012 | Kuo et al. |
| 2012/0110436 A1 | 5/2012 | Adler, III et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185521 A1* | 7/2012 | Giampaolo ....... G06F 17/30144 707/831 |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0240061 A1 | 9/2012 | Hillenius et al. |
| 2012/0257249 A1 | 10/2012 | Natarajan |
| 2012/0263166 A1 | 10/2012 | Cho et al. |
| 2012/0266203 A1 | 10/2012 | Elhadad et al. |
| 2012/0284638 A1 | 11/2012 | Cutler et al. |
| 2012/0284804 A1* | 11/2012 | Lindquist ............ H04L 63/0428 726/29 |
| 2012/0291011 A1 | 11/2012 | Quine |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0117337 A1 | 5/2013 | Dunham |
| 2013/0124638 A1 | 5/2013 | Barreto et al. |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212486 A1 | 8/2013 | Joshi et al. |
| 2013/0239049 A1 | 9/2013 | Perrodin et al. |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0305039 A1 | 11/2013 | Gauda |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0068589 A1 | 3/2014 | Barak |
| 2014/0150023 A1 | 5/2014 | Gudorf et al. |
| 2014/0156373 A1 | 6/2014 | Roberts et al. |
| 2014/0172595 A1 | 6/2014 | Beddow et al. |

FOREIGN PATENT DOCUMENTS

| | | |
|---|---|---|
| CN | 102264063 A | 11/2011 |
| EP | 0921661 A2 | 6/1999 |
| EP | 1349088 | 10/2003 |
| EP | 1528746 A2 | 5/2005 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |

(56) References Cited

FOREIGN PATENT DOCUMENTS

| KR | 20040028036 A | 4/2004 |
|---|---|---|
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110076831 A | 7/2011 |
| WO | WO-0007104 A1 | 2/2000 |
| WO | WO-2002019128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 | 11/2013 |

OTHER PUBLICATIONS

"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"How-to Geek, How to Sync Specific Folders With Dropbox," downloaded from the internet http://www.howtogeek.com, Apr. 23, 2013, 5 pages.
"Microsoft Office SharePoint 2007 User Guide," Feb. 16, 2010, pp. 1-48.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web. Archive.org/web, 3 pages.
"Understanding Metadata," National Information Standards Organization, NISO Press, 2004, 20 pages.
Burns, "Developing Secure Mobile Applications for Android," Oct. 2008, Version 1.0, 1-28 pages.
Cisco, "FTP Load Balancing on ACE in Routed Mode Configuration Example," DocWiki, Jun. 2011, 7 pages.
Cohen, "Debating the Definition of Cloud Computing Platforms," retrieved from the internet, http://forbes.com, Feb. 3, 2014, 7 pages.
Comes, "MediaXchange User's Manual," Version 1.15.15, Feb. 1, 2009, pp. 1-90.
Conner, "Google Apps: The Missing Manual," published by O'Reilly Media, May 27, 2008, 24 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13158415.3, Applicant: Box, Inc. dated Jun. 4, 2013, 8 pages.
Exam Report for EP13168784.0, Applicant: Box, Inc. dated Nov. 21, 2013, 7 pages.
Exam Report for EP13177108.1, Applicant: Box, Inc. dated May 26, 2014, 6 pages.
Exam Report for EP13185269.1, Applicant: Box, Inc. dated Jan. 28, 7 pages.
Exam Report for GB1300188.8, Applicant: Box, Inc. dated May 31, 2013, 8 pages.
Exam Report for GB1306011.6, Applicant: Box, Inc. dated Apr. 18, 2013, 8 pages.
Exam Report for GB1308842.2, Applicant: Box, Inc. dated Mar. 10, 2014, 4 pages.
Exam Report for GB1309209.3, Applicant: Box, Inc. dated Oct. 30, 2013, 11 pages.
Exam Report for GB1310666.1, Applicant: Box, Inc. dated Aug. 30, 2013, 10 pages.
Exam Report for GB1311417.8, Applicant: Box, Inc. dated Dec. 23, 2013, 5 pages.
Exam Report for GB1312095.1, Applicant: Box, Inc. dated Dec. 12, 2013, 7 pages.
Exam Report for GB1312264.3, Applicant: Box, Inc. dated Mar. 24, 2014, 7 pages.
Exam Report for GB1312874.9, Applicant: Box, Inc. dated Dec. 20, 2013, 11 pages.
Exam Report for GB1313559.5, Applicant: Box, Inc., dated Aug. 22, 2013, 19 pages.
Exam Report for GB1314771.5, Applicant: Box, Inc. dated Feb. 17, 2014, 7 pages.
Exam Report for GB1316532.9, Applicant: Box, Inc. dated Oct. 31, 2013, 10 pages.
Exam Report for GB1316533.7, Applicant: Box, Inc. dated Oct. 8, 2013, 9 pages.
Exam Report for GB1316971.9, Applicant: Box, Inc. dated Nov. 26, 2013, 10 pages.
Exam Report for GB1317600.3, Applicant: Box, Inc. dated Nov. 21, 2013, 8 pages.
Exam Report for GB1318373.6, Applicant: Box, Inc. dated Dec. 17, 2013, 4 pages.
Exam Report for GB1318792.7, Applicant: Box, Inc. dated May 22, 2014, 2 pages.
Exam Report for GB1320902.8, Applicant: Box, Inc. dated Dec. 20, 2013, 6 pages.
Gedymin, "Cloud computing with an emphasis on Google App Engine," Master Final Project, Sep. 2011, 146 pages.
International Search Report and Written Opinion for PCT/US2008/012973 dated Apr. 30, 2009, pp. 1-11.
International Search Report and Written Opinion for PCT/US2011/039126 dated Oct. 6, 2011, pp. 1-13.
International Search Report and Written Opinion for PCT/US2011/041308 dated Jul. 2, 2012, pp. 1-16.
International Search Report and Written Opinion for PCT/US2011/047530, Applicant: Box, Inc., dated Mar. 22, 2013, pp. 1-10.
International Search Report and Written Opinion for PCT/US2011/056472 dated Jun. 22, 2012, pp. 1-12.
International Search Report and Written Opinion for PCT/US2011/057938, Applicant: Box, Inc., dated Mar. 29, 2013, 10 pages.
International Search Report and Written Opinion for PCT/US2011/060875 dated Oct. 30, 2012, pp. 1-10.
International Search Report and Written Opinion for PCT/US2012/056955, Applicant: Box, Inc., dated Mar. 27, 2013, pp. 1-11.
International Search Report and Written Opinion for PCT/US2012/063041, Applicant: Box, Inc., dated Mar. 29, 2013, 12 pages.
International Search Report and Written Opinion for PCT/US2012/065617, Applicant: Box, Inc., dated Mar. 29, 2013, 9 pages.
International Search Report and Written Opinion for PCT/US2012/067126, Applicant: Box, Inc., dated Mar. 29, 2013, 10 pages.
International Search Report and Written Opinion for PCT/US2012/070366, Applicant: Box, Inc., dated Apr. 24, 2013, 10 pages.
International Search Report and Written Opinion for PCT/US2013/020267, Applicant: Box, Inc., dated May 7, 2013, 10 pages.

(56) References Cited

OTHER PUBLICATIONS

International Search Report and Written Opinion for PCT/US2013/023889, Applicant: Box, Inc., dated Jun. 24, 2013, 13 pages.
International Search Report and Written Opinion for PCT/US2013/029520, Applicant: Box, Inc., dated Jun. 26, 2013, 10 pages.
International Search Report and Written Opinion for PCT/US2013/034662, Applicant: Box, Inc., dated May 31, 2013, 10 pages.
International Search Report and Written Opinion for PCT/US2013/035404, Applicant: Box, Inc., dated Jun. 26, 2013, 11 pages.
John et al., "Always Sync Support Forums—View topic—Allway sync funny behavior," Allway Sync Support Forum at http://sync-center.com, Mar. 28, 2011, XP055109680, 2 pages.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Partial Search Report for EP131832800, Applicant: Box, Inc. dated May 8, 2014, 5 pages.
Patent Court Document of Approved Judgment for GB0602349.3 and GB0623571.7; Mar. 3, 2009, 17 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP 11729851.3, Applicant: Box, Inc. dated Feb. 7, 2014, 9 pages.
Search Report for EP13187217.8, Applicant: Box, Inc. dated Apr. 15, 2014, 12 pages.
Search Report for EP141509422, Applicant: Box, Inc. dated May 8, 2014, 7 pages.
Search Report for EP14151588.2, Applicant: Box, Inc. dated Apr. 15, 2014, 12 pages.
Search Report for EP14153783.7, Applicant: Box, Inc. dated Mar. 24, 2014, 7 pages.
Sommerer, "Presentable Document Format: Improved On-demand PDF to HTML Conversion," retrieved from the internet, http://research.microsoft.com, 8 pages.
Supplementary European Search Report European Application No. EP 08 85 8563 dated Jun. 20, 2011 pp. 1-5.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
Exam Report for GB1410569.6 Applicant: Box, Inc. dated Jul. 11, 2014, 9 pages.
Extended Search Report for EP131832800, Applicant: Box, Inc. dated Aug. 25, 2014, 7 pages.
Extended Search Report for EP141509422, Applicant: Box, Inc. dated Aug. 26, 2014, 12pages.
Search Report for EP 13189144.2 Applicant: Box, Inc. dated Sep. 1, 2014, 9 pages.
Exam Report for GB1312874.9 Applicant: Box, Inc. dated Sep. 26, 2014, 2 pages.
Exam Report for GB1415126.0 Applicant: Box, Inc. dated Oct. 2, 2014, 8 pages.
Exam Report for GB1415314.2 Applicant: Box, Inc. dated Oct. 7, 2014, 6 pages.
Exam Report for GB1309209.3 Applicant: Box, Inc. dated Oct. 7, 2014, 3 pages.
Exam Report for GB1315232.7 Applicant: Box, Inc. dated Oct. 9, 2014, 5 pages.
Exam Report for GB1318789.3 Applicant: Box, Inc. dated Oct. 30, 2014, 6 pages.
Microsoft Windows XP Professional Product Documentation: How Inheritance Affects File and Folder Permissions, Apr. 11, 2014, 2 pages.
Sommerer, "Presentable Document Format: Improved On-demand PDF to HTML Conversion," retrieved from the internet, http://research.microsoft.com, Nov. 2004, 8 pages.
Exam Report for GB1317393.5 Applicant: Box, Inc. dated Nov. 7, 2014, 6 pages.
Exam Report for GB1311417.8 Applicant: Box, Inc. dated Nov. 7, 2014, 2 pages.
Exam Report for GB1311421.0 Applicant: Box, Inc. dated Nov. 7, 2014, 4 pages.
Exam Report for GB1316682.2 Applicant: Box, Inc. dated Nov. 19, 2014, 6 pages.
Exam Report for GB1312095.1 Applicant: Box, Inc. dated Nov. 19, 2014, 5 pages.
Exam Report for GB1313559.5 Applicant: Box, Inc. dated Nov. 4, 2014, 2 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.

* cited by examiner

SYSTEMS AND METHODS FOR PROVIDING SHELL COMMUNICATION IN A CLOUD-BASED PLATFORM

CROSS-REFERENCE TO RELATED APPLICATIONS AND EFFECTIVE FILING DATE ENTITLEMENT

This application is entitled to the benefit of and/or the right of priority to U.S. Provisional Application No. 61/839,331, entitled "SYSTEMS AND METHODS FOR PROVIDING SHELL COMMUNICATIONS IN A CLOUD-BASED PLATFORM", filed Jun. 25, 2013, which is hereby incorporated by reference in its entirety. This application is therefore entitled to an effective filing date of Jun. 25, 2013.

BACKGROUND

The use of electronic and digital content has greatly increased in enterprise settings or other organizations as the preferred mechanism for project, task, and work flow management, as has the need for streamlined collaboration and sharing of digital content and documents. In such an environment, multiple users share, access and otherwise perform actions or tasks on content and files in a shared workspace, where any number of users may have access to a given file or may want to or need to perform an action on the file at any given time.

The cloud-based nature of such an environment enables users/collaborators to access, view, edit content anytime, from any device, or using any number of and/or types of clients, simultaneously while other collaborators in the same group, enterprise, or other types of organizations may also be accessing, viewing, or editing the same file or content or content in the same work group. It becomes useful therefor to provide information to users/collaborators regarding the status of various files/folders hosted on a cloud-based platform. Inaccurate information provided to users/collaborators regarding the status of shared files/folders may lead to confusion and inconsistency.

BRIEF DESCRIPTION OF THE DRAWINGS

The present embodiments are illustrated by way of example and are not intended to be limited by the figures of the accompanying drawings. In the drawings.

The same reference numbers and any acronyms identify elements or acts with the same or similar structure or functionality throughout the drawings and specification for ease of understanding and convenience.

DETAILED DESCRIPTION

Figure 1:
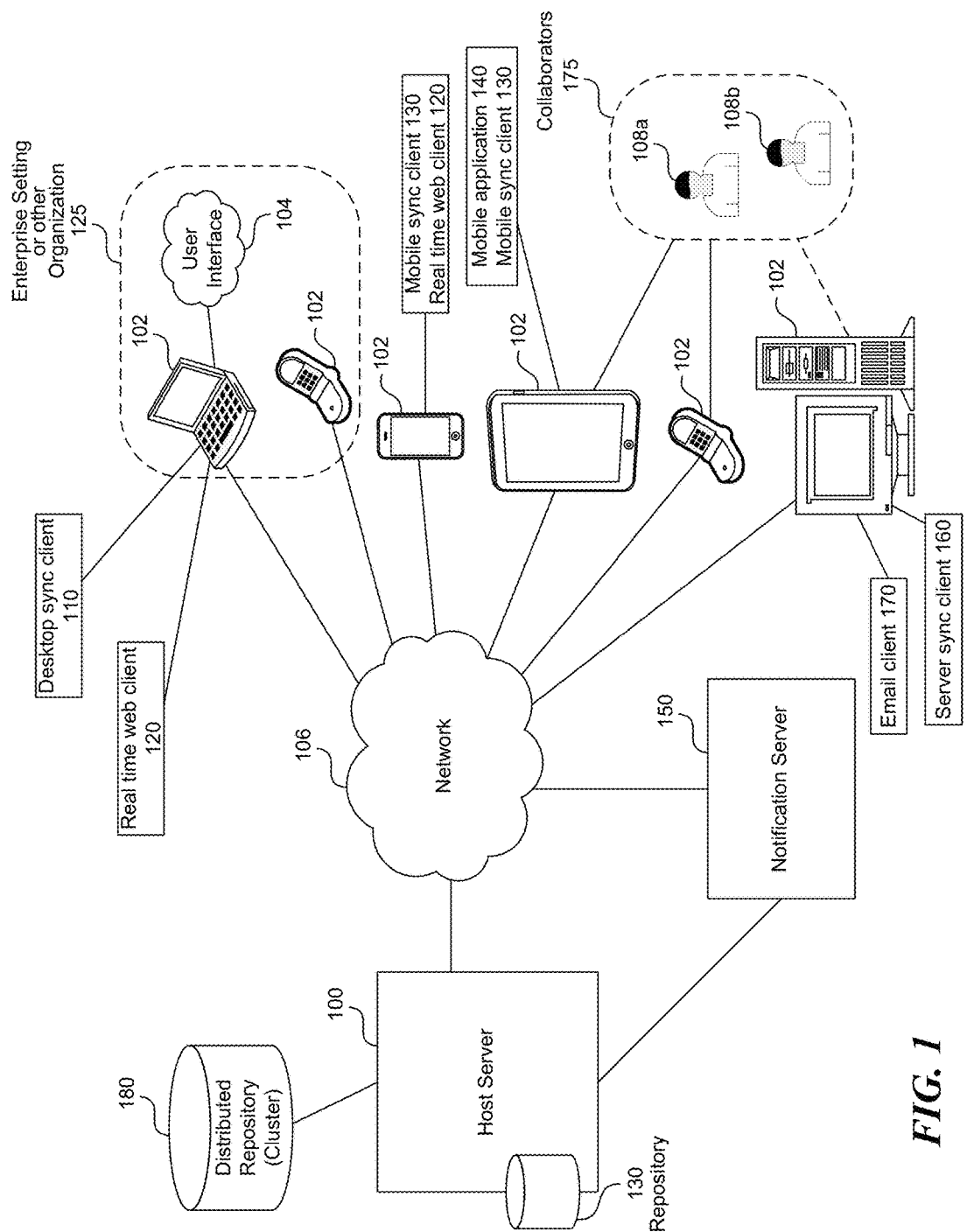
FIG. 1 depicts an example diagram of a system for providing shell icon communications via a remote synchronization client at devices, the shell icon communications regarding status of items hosted on a cloud-based platform.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Overview

Certain embodiments of a cloud-based platform (e.g., cloud-based collaboration platform or service) contemplate shell icon communications facilitated by an iconizer monitoring an icon repository file maintained by a remote synchronization client. According to some embodiments, the iconizer may be a thread of code in the remote synchronization client. According to some embodiments the iconizer may be a thread of code injected into a finder of a device operating system (e.g. explorer in Windows) and exist as a component of the operating system (e.g. a COM component in Windows). According to some embodiments iconizer may communicate with the remote synchronization client and using information gathered from an icon repository file, generate and/or display an icon for a work item to a collaborator indicating the status of the work item. According to some embodiments, where this code is platform specific, it may be kept as minimal as possible. In addition, according to some embodiments an iconizer may be loaded into nearly every process on an operating system (e.g. the COM component may be loaded for shared code like File Open dialogs). According to some embodiments, a remote synchronization client may determine icons for all files and folders and simply inform the iconizer of changes to icons via modification to an icon repository file. Some embodiments may allow for communication between a remote synchronization client and multiple iconizers on a particular operating system (e.g. Windows). Some embodiments may reduce data duplication in an iconizer. Some embodiments may allow for icon changes in real time or near real time.

Design

FIG. 1 illustrates an example diagram of a system for providing shell icon communications via a remote synchronization client at devices, the shell icon communications regarding status of items hosted on a cloud-based platform. As shown in FIG. 1, a host server 100 of a cloud-based service, collaboration and/or cloud storage platform can incrementally update remote synchronization clients (e.g., clients 110, 120, 130, 140, 160, 170) at devices 102 with events that occurred via the platform hosted by the server 100.

The client devices 102 can be any system and/or device, and/or any combination of devices/systems that is able to establish a communication or a connection, including wired, wireless, cellular connections with another device, a server and/or other systems such as host server 100 and/or a notification server 150. Client devices 102 typically include a display and/or other output functionalities to present information and data exchanged between among the devices 102, the notification server 150, and/or the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a PDA, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a tablet PC, a thin-client, a hand held console, a hand held gaming device or console (e.g., XBOX live, Nintendo DS, Sony PlayStation Portable, etc.), mobile-enabled powered watch (e.g., iOS, Android or other platform based), Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102, host server 100, and/or the notification server 150 (e.g., a server hosting application 120) are coupled via a network 106. In some embodiments, the devices 102 and host server 100 and/or notification server 150 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used by various users or collaborators (e.g., collaborators 108) for accessing, through network 106, a web-based collaboration environment or online collaboration platform (e.g., hosted by the host server 100). The collaboration environment or platform can have one or more collective settings 125 for an enterprise or an organization that the users belong, and can provide an user interface 104 for the users to access such platform under the settings 125.

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A work item may also refer to folders containing various combinations of digital content as previously described. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a workspace and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a workspace for other users to access (e.g., for viewing, editing, commenting, signing-off, or otherwise manipulating). The user can login to the online platform and upload the document (or any other type of work item) to an existing workspace or to a new workspace. The document can be shared with existing users or collaborators in a workspace.

In general, network 106, over which the client devices 102 and the host server 100 communicate may be a cellular network, a telephonic network, an open network, such as the Internet, or a private network, such as an intranet and/or the extranet, or any combination or variation thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 2:
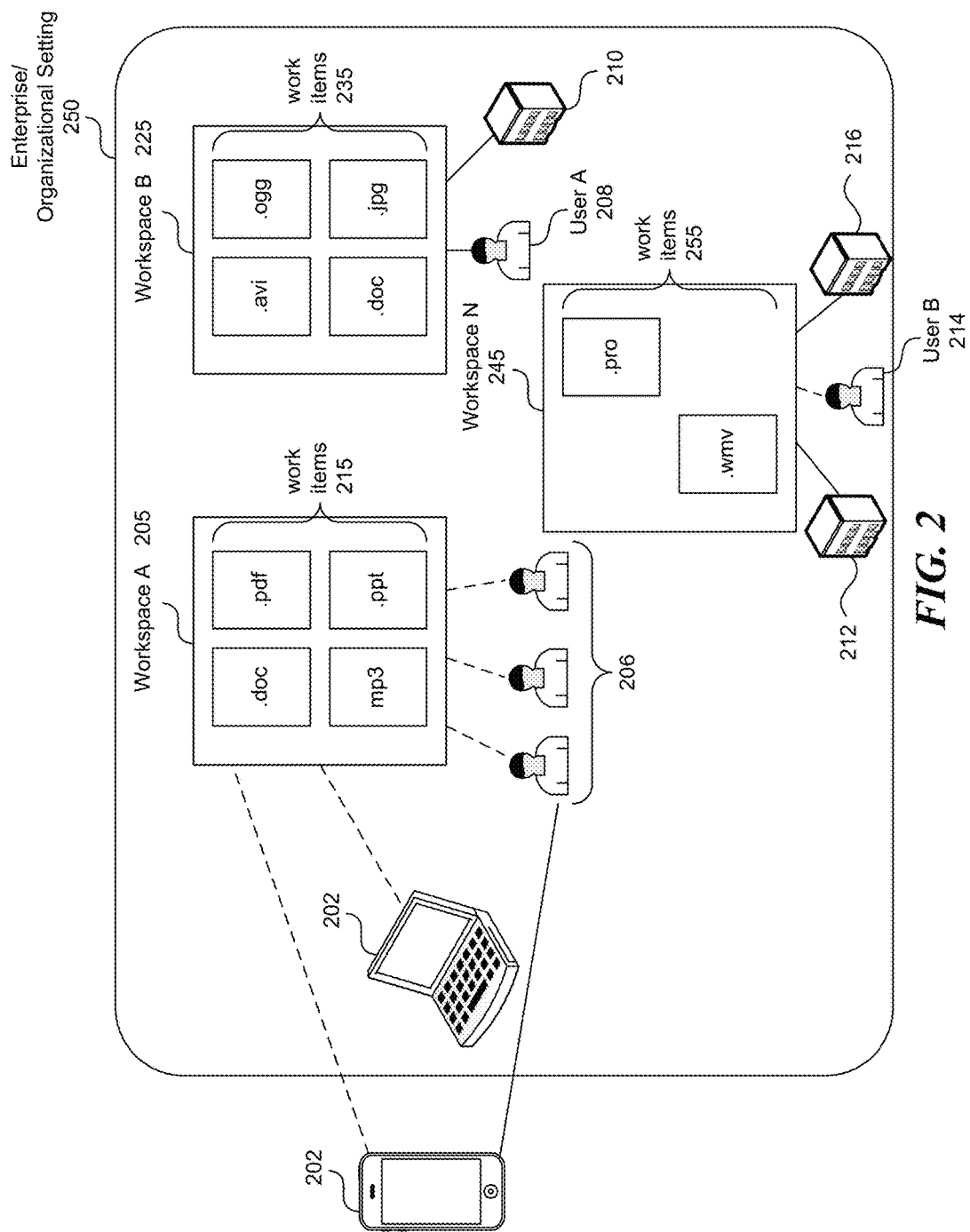
FIG. 2 depicts an example diagram of a web-based or online collaboration platform deployed in an enterprise or other organizational setting for organizing work items and workspaces.

A diagrammatic illustration of the cloud-based environment (e.g., collaboration environment) and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3A.

Embodiments of the present disclosure provide shell icon communications via an iconizer and remote synchronization client at devices, the shell icon communications regarding status of items hosted on a cloud-based platform. According to some embodiments, the iconizer may exist as a thread of code in a remote synchronization client (e.g. remote clients 110-170 on user devices 102). According to some embodiments, the iconizer may be injected into a finder of a device operating system (e.g. explorer in Windows) and exist as a component of the operating system. According to some embodiments iconizer may communicate with the remote synchronization client and display an icon for a work item to a collaborator indicating the status of the work item in the workspace hosted by the cloud-based platform. Examples of status may include, but are not limited to "synchronized," "not synchronized," "in-progress," "locked," un-locked," "collaborating," "problem," "hidden," etc.

In general, multiple users collaborate in the cloud-based environment hosted by server 100, and the user devices 102 of these users need to be appropriately updated such that the most current versions of data/content are synchronized with the relevant user devices and that notification of events are sent to the relevant devices/users in a timely and orderly fashion. Any given user can utilize any number and types of clients (e.g., synchronization client, real time web client, mobile synchronization client, mobile application, email client, server synchronization client, etc.) at any given time. Thus, the host server 100 and the remote synchronization clients 110-170 described herein together can implement the disclosed techniques in facilitating the orderly synchronizing or updating of the remote clients 110-170 which a given user/collaborator may use to access the cloud platform via any number of user devices 102.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, workspace A 205 can be associated with work items 215, workspace B 225 can be associated with work items 235, and workspace N can be associated with work items 255. The work items 215, 235, and 255 can be unique to each workspace but need not be. For example, a particular word document can be associated with only one workspace (e.g., workspace A 205) or it can be associated with multiple workspaces (e.g., Workspace A 205 and workspace B 225, etc.).

In general, each workspace has a set of users or collaborators associated with it. For example, workspace A 205 is associated with multiple users or collaborators 206. In some instances, workspaces deployed in an enterprise can be department specific. For example, workspace B can be associated with department 210 and some users shown as example user A 208 and workspace N 245 can be associated with departments 212 and 216 and users shown as example user B 214.

Each user associated with a workspace can generally access the work items associated with the workspace. The level of access depends on permissions associated with the specific workspace, and/or with a specific work item. Permissions can be set for the workspace or set individually on a per work item basis. For example, the creator of a workspace (e.g., one of user A 208 who creates workspace B) can set one permission setting applicable to all work items 235 for other associated users and/or users associated with the affiliate department 210, for example. Creator user A 208 can also set different permission settings for each work item, which can be the same for different users, or varying for different users.

In each workspace A, B . . . N, when an action is performed on a work item by a given user or any other activity is detected in the workspace, other users in the same workspace can be notified (e.g., in real time or in near real time, or not in real time). Activities which trigger real time notifications can include, by way of example but not limitation, adding, deleting, or modifying collaborators in the workspace, uploading, downloading, adding, deleting a work item in the workspace, creating a discussion topic in the workspace.

In some embodiments, items or content downloaded or edited can cause notifications to be generated. Such notifications can be sent to relevant users to notify them of actions surrounding a download, an edit, a change, a modification, a new file, a conflicting version, an upload of an edited or modified file.

Figure 3A:
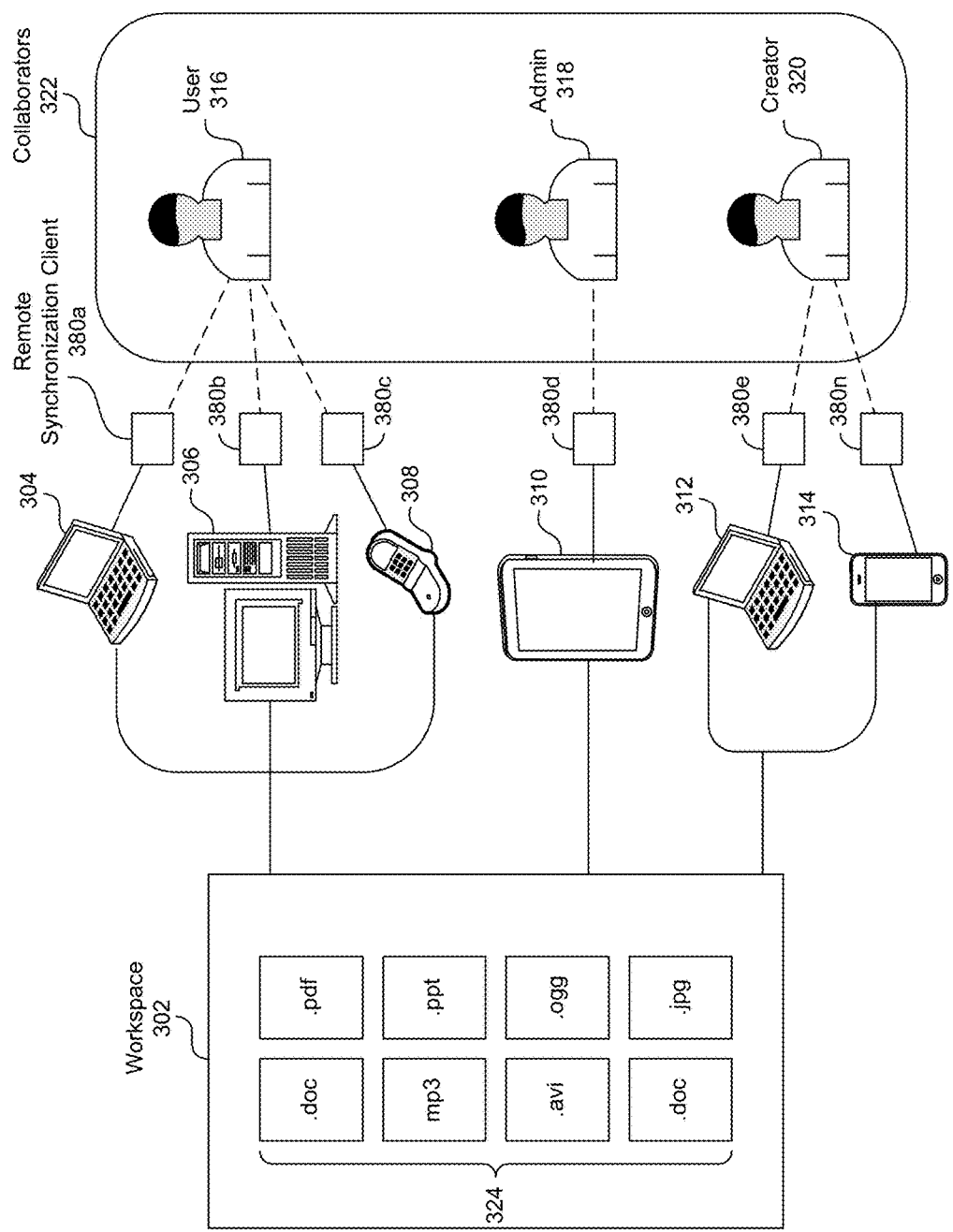
FIG. 3A depicts an example diagram of a workspace in a cloud-based platform such as an online or web-based collaboration environment accessible by multiple collaborators through various devices.

FIG. 3A depicts an example diagram of a workspace 302 in an online or web-based collaboration environment accessible by multiple collaborators 322 through various devices.

Each of users 316, 318, and 320 can individually use multiple different devices to access and/or manipulate work items 324 in the workspace 302 with which they are associated. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items to be edited or viewed can be accessed from the workspace 302. Users may be informed of status of work items 324 via shell icon communications. For example, if a user 316 modifies a work item 324 via a remote synchronization client 340A on user device 304, the other remote synchronization clients (e.g. sync clients 340a-n) may receive the modified work item 324 in real time, near real-time, or not in real-time. In such an example, after user 316 has modified work item 324, other collaborators may view work item 324 (e.g. via sync clients 340a-n), and that work item 324 may have a status. The present teachings disclose that such status may be provided via shell icon communications. For example, work item 324 as it appears to collaborator 320 via remote synchronization client 340E on device 312 may have a status of "synchronized," in which case an icon and/or icon overlay may indicate to collaborator 320 that work item 324 is synchronized with modification provided by user 316. Similarly where synchronization is in progress, but not yet complete, work item 324 as it appears to collaborator 320 via remote synchronization client 340E may have a status of "in-progress," in which case an icon and/or icon overlay may indicate to collaborator 320 that work item 324 is being updated to incorporate modifications by user 316.

Users can also be notified of access, edit, modification, and/or upload related-actions performed on work items 324 by other users or any other types of activities detected in the workspace 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, the notification feed stream further enables users to create or generate actionable events (e.g., as task) which are or can be performed by other users 316 or collaborators 322 (e.g., including admin users or other users not in the same workspace), either in the same workspace 302 or in some other workspace. The actionable events such as tasks can also be assigned or delegated to other users via the same user interface.

For example, a given notification regarding a work item 324 can be associated with user interface features allowing a user 316 to assign a task related to the work item 324 (e.g., to another user 316, admin user 318, creator user 320 or another user). In one embodiment, a commenting user interface or a comment action associated with a notification can be used in conjunction with user interface features to enable task assignment, delegation, and/or management of the relevant work item or work items in the relevant workspaces, in the same user interface.

Figure 3B:
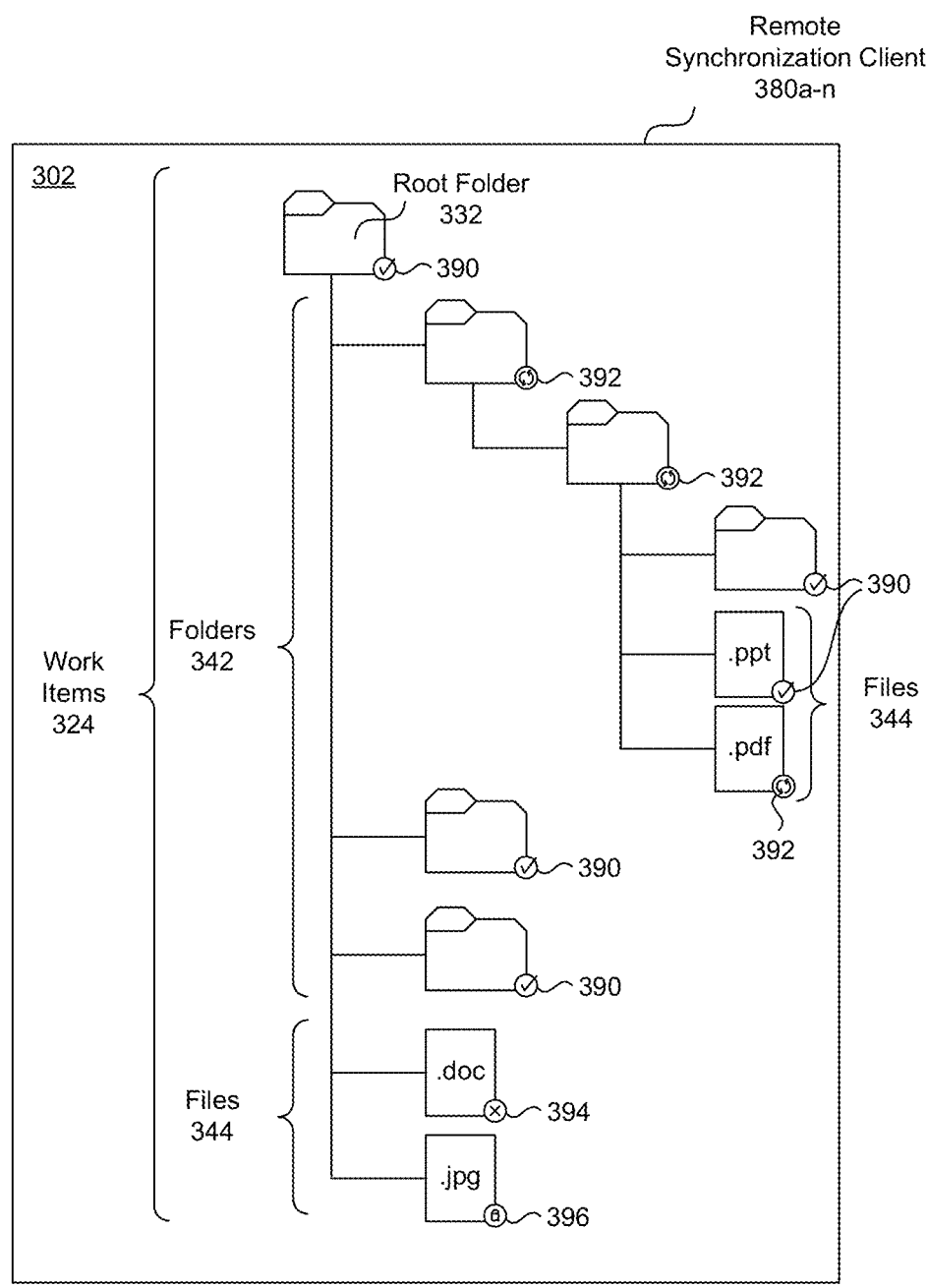
FIG. 3B depicts an abstract diagram illustrating example icons indicating status of the folders and files in the workspace of FIG. 3A.

FIG. 3B illustrates an example embodiment of shell icon communications associated with folders and files in the workspace 302 of FIG. 3A, as they may appear to a user (e.g. user 316 of FIG. 3A) via a remote synchronization client (e.g. sync client 380a-n of FIG. 3A) at a device (e.g. devices 304, 306, 308, 312, and 314 of FIG. 3A), according to some embodiments. As illustrated in FIG. 3B, work items 324 of FIG. 3A may be represented via a remote synchronization client 380a-n and may be organized into groups using one or more folders 342 within workspace 302. The folders 342 may have more than one levels of hierarchy including, for example, parent/ascendant folder(s), child/descendant folder(s) or subfolder(s), and/or sibling folder(s). A person having ordinary skill in the art will understand that terminologies describing the hierarchy of the folders are used in a relative sense. For example, a parent folder can be a child folder of a grandparent folder, a particular child folder can be a parent folder of a grandchild folder, and so on. It is noted that the illustration of the folders are merely exemplary; depending on the embodiments, there can be more than one level of hierarchy between the illustrated folders.

According to some of the present embodiments, the state of work items 324, including folders 342 and files 344 may be, (i) synchronized, (ii) partially synchronized, (iii) unsynchronized, (iv) in progress, (v) collaborating, (vi) locked, (vii) un-locked, (viii) hidden, or (viv) problem. For purposes of discussion herein, a file 344 may be synchronized at a remote synchronization client 380a-n when it is synchronized with the corresponding work item as hosted on an associated cloud-based platform (e.g. host server 100 of a cloud-based service, collaboration and/or cloud storage platform as illustrated in FIG. 1). A file 344 may be in-progress when an event has occurred via the cloud-based platform and the synchronization client 380a-n is in the process of updating file 344 to reflect the corresponding file as hosted on the associated cloud-based platform. A file 344 may be collaborating when two or more collaborators (e.g. collaborators 316, 318 and 320 as illustrated in FIG. 3A are concurrently modifying the same work item. A file 344 may be locked when the corresponding work item is locked for editing by other collaborators via the cloud-based platform. A file 344 may be hidden when the synchronization client 380a-n is preset by the user not to display the file. A file 344 may have a status of problem when a problem is synchronization has occurred via the cloud-based platform. Further, a folder may have a status of synchronized when all items (e.g., folders and files) under the folder are synchronized. Likewise, a folder may have a status of unsynchronized when all items (e.g., folders and files) under the folder are unsynchronized. A folder may have a status of in progress when synchronization client 380a-n is in the process of updating a file 344, and/or some but not all items (e.g. files and folders) under the folder are synchronized.

According to some embodiments information regarding status may be provided to a user via a remote synchronization client and associated iconizer. Status may be displayed as an icon or modification to an icon such as an icon overlay. For example, a status of synchronized may be indicated by an icon overlay 390, a status of in progress may be indicated by an icon overlay 392, a status of problem any be indicated by icon overlay 394, and a status of locked may be indicated by an icon overlay 396.

Figure 4A:
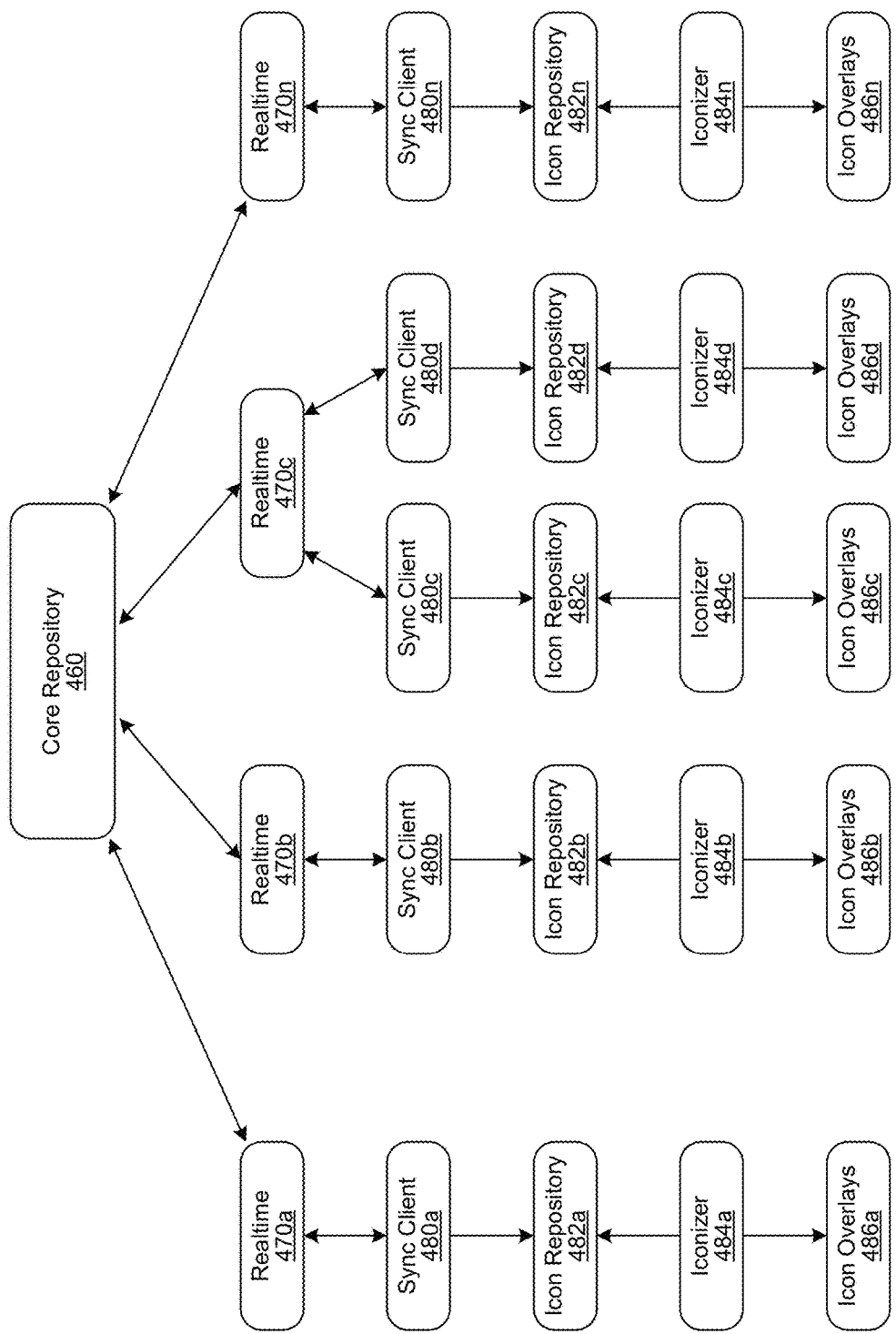
FIG. 4A depicts an example system block diagram showing the interaction between client-side components for providing shell communication in a cloud based environment.

FIG. 4A depicts an example block diagram showing the interaction of remote clients 470a-n and 480a-n with a centralized and/or distributed core repository cluster 460 (e.g. similar to distributed repository cluster 180 as illustrated in FIG. 1) for incremental updates of events/actions which occurred at a cloud-based environment. The remote clients may include, for example real time clients 470a-n (e.g., real-time web clients launched via a web browser, mobile application), and synchronization clients 480a-n (e.g., desktop synchronization, mobile synchronization, server synchronization, etc.) that users or collaborators use to interface/access the cloud-based platform including, but not limited to, a collaboration environment. Other types of clients may also read from the repository cluster 460.

The queues in the repository 460 (e.g., the distributed repository cluster) are usually client type specific. For example, each queue is for a given client type for one given user. So, a user 'A' may have a synchronization client queue that all of the synchronization clients that user "A" uses reads from since user "A" may have multiple devices on which synchronization clients are installed. In general, the queues for clients in the repository 460 are read only queues such that multiple clients can read from the same queue without making modifications. In this manner, if a user utilizes multiple synchronization clients, each client can still receive and detect the respective updates such that multiple devices can be synchronized. The remote clients also typically individually track the location in the queue from which they last read such that only the most recent events are updated at the client, and that the events read from a queue is specific to a given client, dependent on what has previously been synchronized or read.

According to some embodiments, sync clients 480a-n may create and modify in real-time, icon repository files 482a-n with data entries associated with the current state of work items (e.g. work items 324 in FIGS. 3A and 3B) at remote clients. The iconizers 484a-n may monitor icon repository files 482a-n and based on the included entries, generate and display appropriate icons 486a-n (e.g. through the use of icon overlays 380, 382, 384, and 386 as illustrated in FIG. 3B) representing the current state of work items at remote clients.

According to some embodiments, icon repository files 482a-n may be created with SQLite. In some embodiments, SQLite has built in support for multiple processes reading and writing to the same repository using a read-many-write-once lock. According to some embodiments, iconizers 484a-n may use standard file watching and file presence for additional forms of communication. According to some embodiments, icon repository files 482a-n be next to the existing repository file that the core engine uses (e.g. an instantiation of core repository 460). Besides being easy to locate, such a configuration may provide the benefit of it being included in bug reports.

Icon Repository Content

Figure 4B:
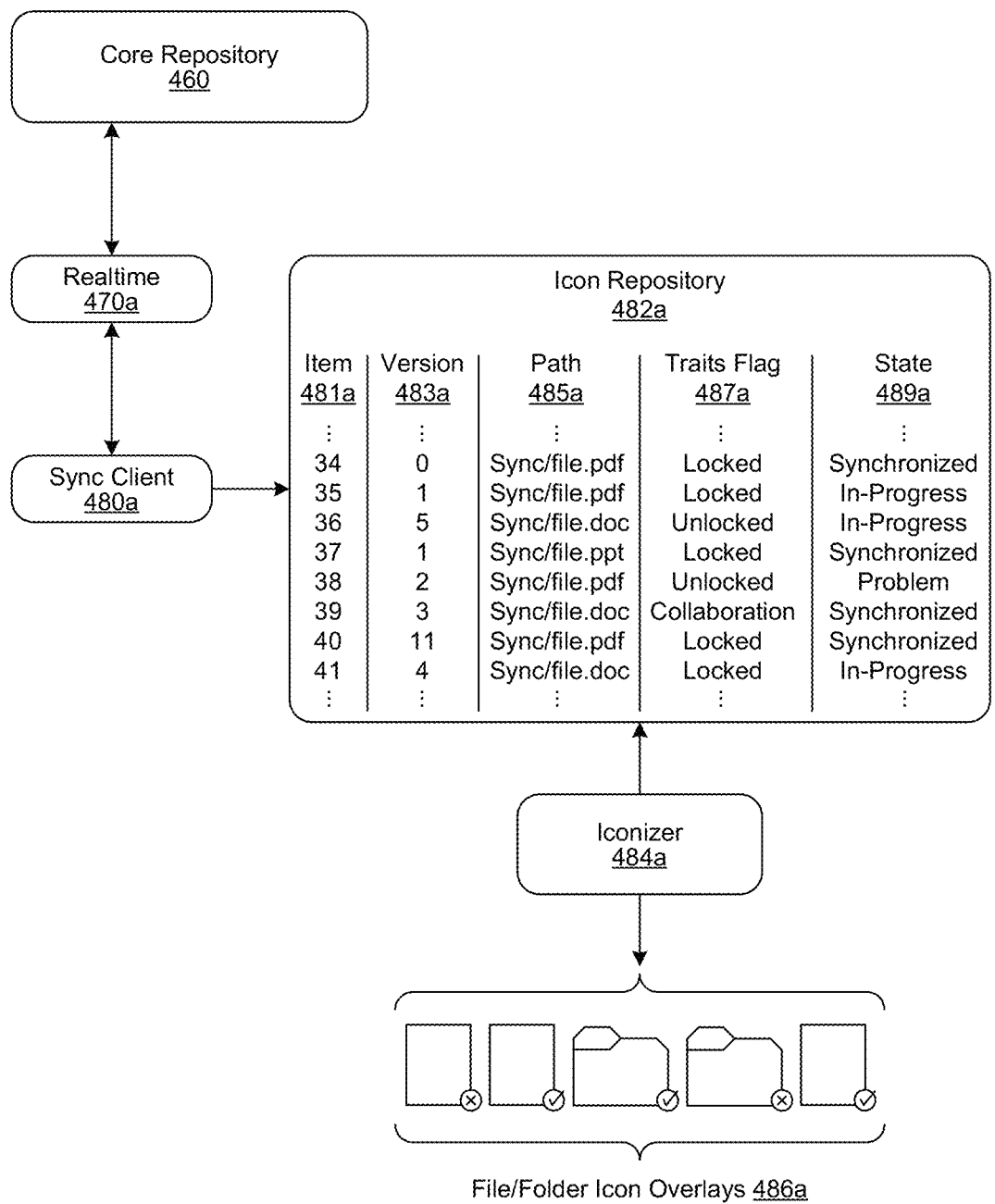
FIG. 4B depicts a detail of an example system block diagram showing the interaction between client-side components for providing shell communication in a cloud based environment at a single client.

As illustrated in FIG. 4B, according to some embodiments, icon repository files 482a-n may consist of rows entries 481a-n of four values: (i) version 483a-n, (ii) path 485a-n, (iii) traits flags 487a-n, and (iv) icon state 489a-n. For simplicity, FIG. 4B illustrates only the interactions between core repository 460, realtime client 470a, sync client 480a, icon repository file 482a, and iconizer 484a. In other words, at a single client device. According to some embodiments, each entry 481a may represent a work item hosted on a cloud-based platform. The version 483a, according to some embodiments, a 64-bit unsigned integer, may refer to the update when the entry 481a was last modified. According to some embodiments, a synchronization client (e.g. sync client 480a) may increment the version value 483a of each entry 481a every time it updates the entry. For any file in the sync directory, iconizer 484a may retrieve the icon state for a particular work item by reading the corresponding entry for that work item. According to some embodiments, path 485a may refer to a file path for a particular work item stored in the sync directory at sync client 480a. If the path 485a does not appear in the icon repository file 482a, that particular work item may be considered synchronized with no special traits. According to some embodiments, values of traits flags 487a, may include, but are not limited to "locked," "locked," "unlocked," and "collaborating." According to some embodiments, combinations of traits such as collaboration and unlock may be possible. Alternately, some combinations of traits may not be possible (e.g. collaboration+lock). Even where some combinations of trait flags may not be possible, the iconizer 484a may treat all flags as independent and rely on sync client 480a to set them appropriately. According to some embodiments, values of icon state may include, but are not limited to "synchronized," "not synchronized," "in progress," "hidden," and "problem." As files synchronize it may be expected that only one row in icon repository file 482a will change—to have an icon state 489a with a value of "synced" and the most recent version 483a.

Additional Information

According to some embodiments, the sync directory and its version are stored in the one-row table. When the sync_directory version increments, the iconizer can invalidate all overlays even if the sync_directory field is unchanged.

Example Embodiments—Iconizer Startup

Embodiments A

According to some embodiments an iconizer can open a mailslot for listening (windows)/broadcast notifications (mac), and may then search for a sync client, if found it may send an "iconizer-started message." The sync client may respond by sending sync_directory name and the status of all files that are not synced one-by-one to the iconizer. Until the sync client has sent the sync_directory no icons are drawn in some embodiments. Then icons are updated as messages arrive.

Embodiments B

According to some embodiments, and with reference to FIGS. 4A and 4B, iconizer 484a-n may monitor a synchronization directory of sync client 480A-N for changes. If an icon repository file 482a-n is detected, iconizer 484a-n may open the file with SQLite. According to some embodiments, whenever iconizer 484a-n detects a change to the icon repository file 482a-n (or the file appears), iconizer 484a-n may use the file to update icons 493a-n for workspace items (e.g. files and/or folders 342 and 344 as illustrated in FIG. 3B). If the icon repository file 482a-n is not present or the sync directory is not specified in the file, no icons are drawn. This last fact can allow sync client 480a-n to turn icons on or off (for example at exit or when moving the sync point) even if other Iconizers are using the icon repository.

Embodiment Comparison—Sync Startup

Embodiments A

According to some embodiments, when a sync client starts up it may attempt to open communication with an iconizer. If communication fails, the sync client may wait until a broadcast arrives indicating that iconizer has initialized and may then try again. Once established, the sync client may send the sync directory name and status of all items in-progress/hidden/problem to the iconizer.

Embodiments B

According to some embodiments, and with reference to FIGS. 4A and 4B, sync client 480a-n may write an empty icon repository file 482a-n if one does not already exist in the sync directory. That is, sync client 480A-N may write out the sync directory name and directory version of 0 to the shared file. There may be no entry rows in the icon repository file 482a-n table at startup according to some embodiments. On subsequent startups, the sync client 480a-n may increment the version of icon repository file 482a-n by one, delete all rows with synced or in progress icons, non-trait files, and set the sync directory with the current version.

Embodiment Comparison—File/Folder Transitions from Synced to in-Progress (or Hidden or Problem)

Embodiments A

According to some embodiments, a sync client may send a message to the iconizer stating that a given path has changed to a status of "in-progress." In certain situations (for example, where files/folders are moved) two path messages may be sent by the sync client to the iconizer. For each path message, the iconizer may update its repository with the new information and invalidate the icon for the specified path.

Embodiments B

According to some embodiments, and with reference to FIGS. 4A and 4B, sync client 480a-n may increment the file version number 483a-n and add a row to the table with the current version 483a-n, path name 485a-n, traits 487a-n, and icon status 489a-N. For example, where the synch client 480a determines that a file and/or folder has transitioned from "synched" to "in-progress," the synch client 480a may set icon state 489a for the particular work item entry to "in progress." If there is already a row with the given path, that row may be updated with the current icon state 489a and version 483a. In certain instances (like for example, where a file/folder is moved) synch client 480a-n may add two entry rows. Iconizer 484a-n may notice the change to the icon repository file 482a-n, determine the entry rows with incremented versions 483a-n (e.g. where the entry row is greater than the corresponding entry row when last read by the iconizer 484a-n), and updates the icons 486a-n for the work items associated with the entry rows. According to some embodiments, iconizer 484a-n may update its own version of an icon repository file to match the newest version of icon repository file 482a-n read.

Figure 6:
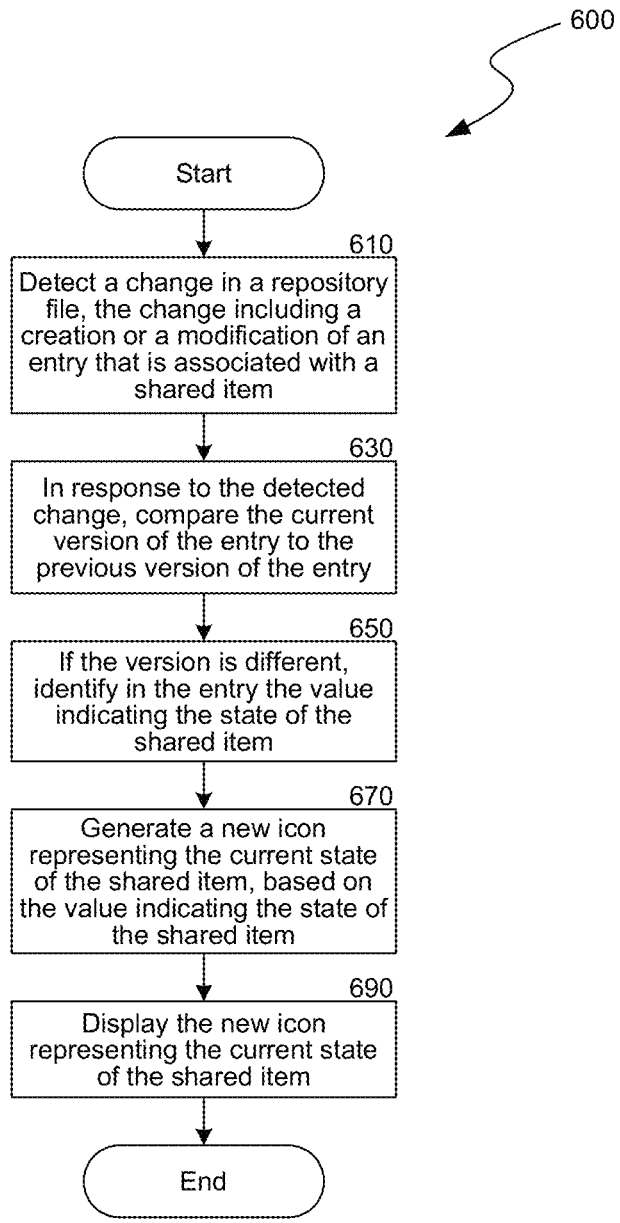
FIG. 6 depicts a flow chart illustrating an example process for providing shell communication in a cloud based environment.

FIG. 6 depicts a flow chart illustrating an example process 600 for displaying, by an iconizer, an icon representing a current state of a shared item stored locally on a client device with a synchronization client, the shared item shared with collaborators via a workspace hosted by a cloud-based platform. The process may be implemented, as described previously by an iconizer, for example iconizer 482a-n as described above and illustrated in FIGS. 4A and 4B.

At step 610 in FIG. 6, and with reference to FIG. 4B as an example, an iconizer 484a, may detect a change in a repository file 482a, the change including a creation or a modification of an entry that is associated with a shared item (e.g. one of the item rows 481a as illustrated in icon repository 482a in FIG. 4B). According to some embodiments, the creation and/or modification may be performed by a sync client 480a.

At step 630 in FIG. 6, and with reference to FIG. 4B as an example, in response to the detected change, an iconizer 484a may compare the current version (e.g. version value 483A) of the entry as it as it exists in a first (i.e. "unmodified") state of the icon repository file 482a to the version of the entry (e.g. version value 483a) as it exists in a second (i.e. "modified") state of the icon repository file 482a.

At step 650 in FIG. 6, and with reference to FIG. 4B as an example, if the value indicating the version of the entry (e.g. version value 483a) as it exists in the first state of the icon repository file 482a is different than the value indicating the version of the entry (e.g. version value 483a) as it exists in the second state of the icon repository file 482a, the iconizer 484a may identify the value indicating the state of the shared item (e.g. state value 489*a*) as it appears in the second state of the repository file;

At step 670 in FIG. 6, and with reference to FIG. 4B as an example, the iconizer 484A may generate a new icon and/or icon overlay (e.g. icon overlay 486*a*) representing the current state of the shared item, based on the value indicating the state of the shared item (e.g. state value 489*a*) as it appears in the second state of the icon repository file 482*a*.

At step 690 in FIG. 6, and with reference to FIG. 4B as an example, the iconizer 484A may display a new icon and/or icon overlay (e.g. icon overlay 486*a*) representing the current state of the shared item.

Figure 7:
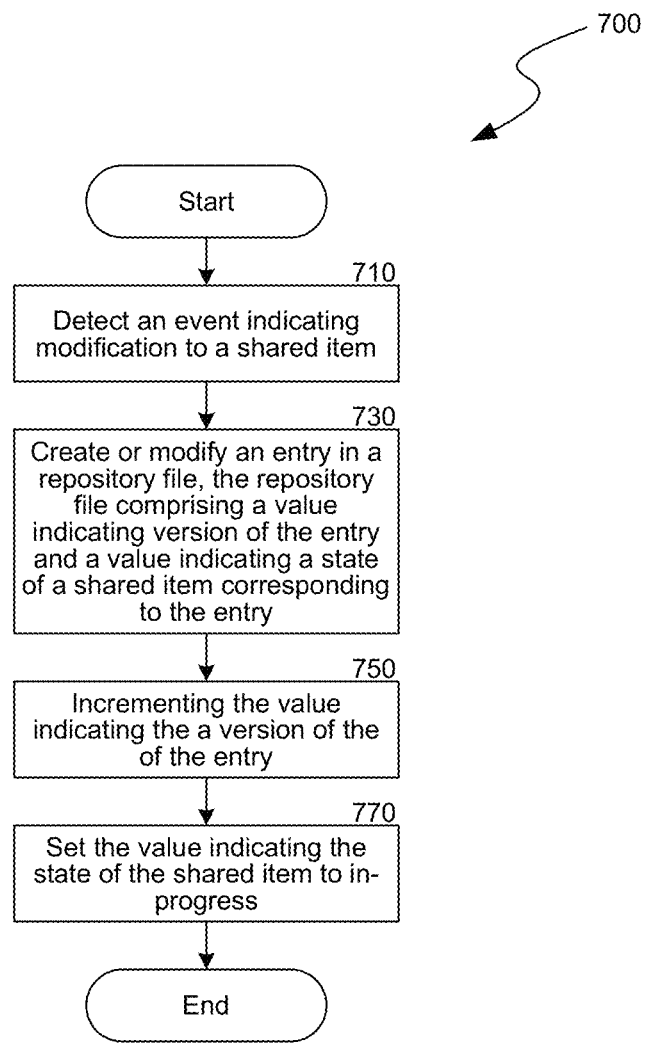
FIG. 7 depicts a flow chart illustrating an example process for providing shell communication in a cloud based environment.

FIG. 7 depicts a flow chart illustrating an example process 700 for informing an iconizer, by a sync client of a change in status of a shared item at a synchronization client using a repository file monitored by the iconizer, the shared item being shared with collaborators and stored in a workspace hosted by a cloud-based platform. The process may be implemented, as described previously by a remote synchronization client, for example synch client 480*a-n* as described above and as illustrated in FIGS. 4A and 4B.

Figure 5:
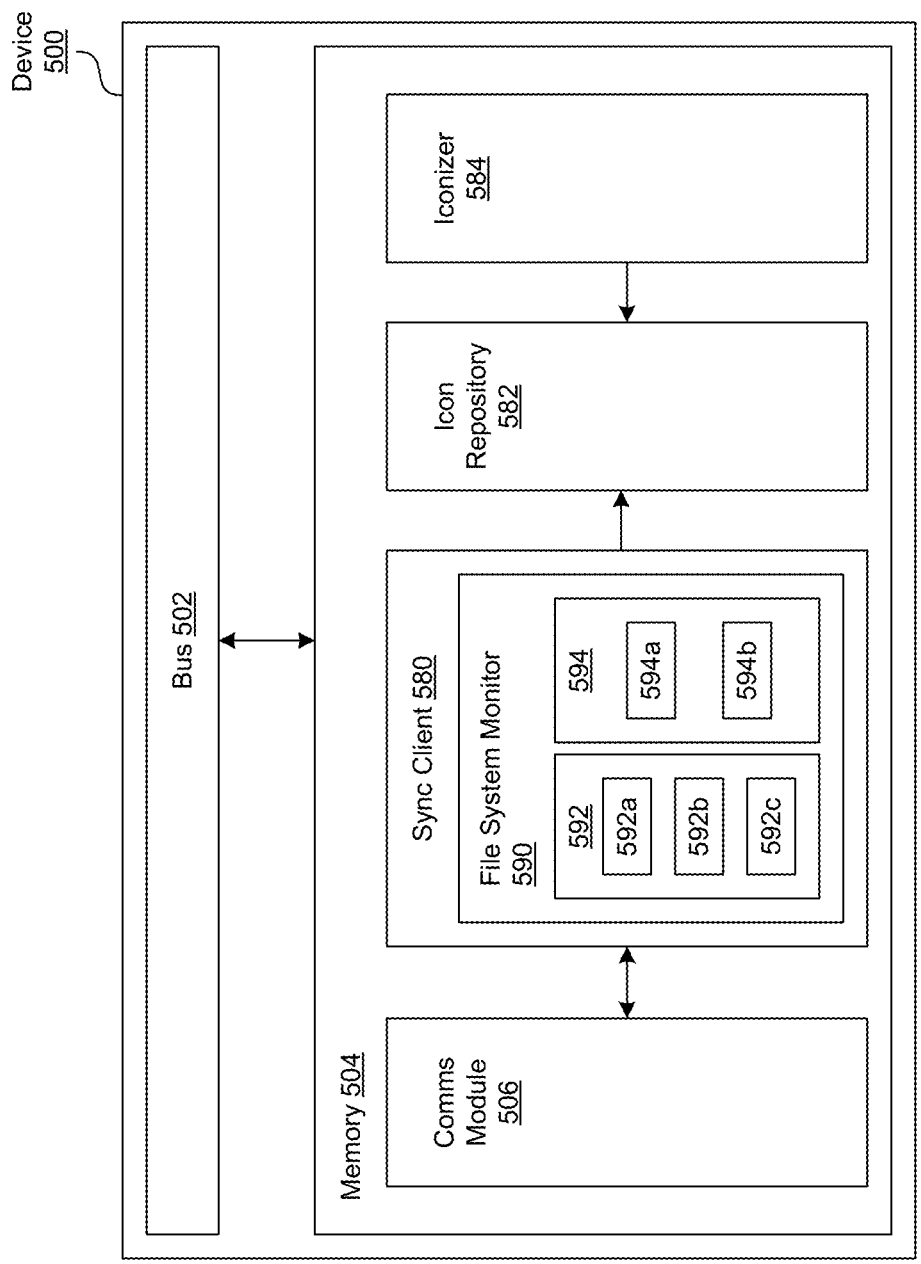
FIG. 5 depicts a block diagram illustrating an example system showing select components described in relation to FIGS. 1-4B on the client side of the cloud-based platform for providing shell communication in a cloud based environment.

At step 710 in FIG. 7, and with reference to FIG. 4B as an example, a sync client 480*a* may detect an event indicating a modification to a shared item, for example as described herein with reference to FIG. 5.

At step 730 in FIG. 7, and with reference to FIG. 4B as an example, the sync client 480*a* may create and/or modify an entry (e.g. one of the item rows 481*a* as illustrated in icon repository file 482*a* in FIG. 4B) in an icon repository file 482*a*, the entry corresponding to the shared item, wherein the entry comprises a value indicating a version of the entry (e.g. version value 483*a*) and a value indicating a state of the shared item corresponding to the entry (e.g. state value 489*a*).

At step 750 in FIG. 7, and with reference to FIG. 4B as an example, the sync client 480*a* may increment the value indicating the a version of the of the entry (e.g. version value 483*a*). For simplicity FIG. 4B illustrates version values as single digit integers, for example "1." In this simplified example, the sync client 480*a* may increment a a version value from "1" to "2." However as disclosed earlier, according to some embodiments, version values may be 64-bit unsigned integer.

At Step 770 in FIG. 7, and with reference to FIG. 4B as an example, the sync client 480*a* may set the value indicating the state of the shared item (e.g. state value 489*a*) to "in-progress."

Embodiment Comparison—File/Folder Transitions Goes from in-Progress to Synced

Embodiments A

According to some embodiments, the process may similar to that described above except that sync client may remove a row from its repository and invalidate the icon for the particular file/folder path.

Embodiments B

According to some embodiments, and with reference to FIGS. 4A-4B and 6-7, the process may be similar to that described above except that the icon status value 489*a-n* for a particular entry row is changed by the sync client 480*a* from "in-progress" to "synched."

Embodiment Comparison—Sync Exits

Embodiments A

According to some embodiments, a sync client may send a "quit" message to the iconizer. When the iconizer receives the message, it may clear its repository and forget the sync directory name. According to some embodiments, the iconizer may not display icons until it receives a sync startup message with the sync directory.

Embodiments B

According to some embodiments, and with reference to FIGS. 4A and 4B, sync client 480*a-n* may set the sync directory to empty. The iconizer 484*a-n* may notices the change, and with no sync directory, display no overlays for icons 486*a-n*. The iconizer 484*a-n* may close its connection with the icon repository file 482*a-n*. According to some embodiments, iconizer 484*a-n* may be unloaded by an overlay handler (not shown).

Embodiment Comparison—Item Trait Message

Embodiments A

According to some embodiments, a sync client may send a trait message to the iconizer to mark a path as locked/unlocked or to mark a path as collaboration or custom link. The iconizer may then change system files or update icon overlays for files/folders as appropriate.

Embodiments B

According to some embodiments, and with reference to FIGS. 4A and 4B, sync client 480*a-n* may increment the version 483*a-n* for a particular row entry in icon repository file 482*a-n*. The iconizer 484*a-n* may notices the change to the icon repository file 482*a-n* and change system files and/or update the icon overlays for files/folders 486*a-n* as appropriate.

Embodiment Comparison—Repository Packing

Embodiments A

According to some embodiments, a synch client may remove rows for paths that are synchronized after a reasonable interval. The synch client may message the iconizer informing it of the changes. Sync client may set a timer (e.g. for 10 minutes) after which it may be very safe to remove the rows from the repository.

Embodiments B

According to some embodiments, and with reference to FIGS. 4A and 4B, when sync client 480*a-n* decides to reduce the size of icon repository file 482A-n it can rewrite the file to delete all the synchronized entries that have been in the repository for long enough to be detected and painted by iconizer 484*a-n*. The sync client 480*a-n* may keep a count of all work items updated to a synchronized state. When a threshold value is passed, sync client 480*a-n* may schedule a deletion of all synchronized rows with a version below the current version. Sync client 480*a-n* may reset the count and begin a new counter, but may not schedule another repository pack if one is already scheduled. It could occur that some rows transition multiple times. A set or bloom filter may be used to reduce this, but it may be unnecessary to prevent one SQL command in reasonable interval.

Additional Considerations

According to some embodiments, and with reference to FIGS. 4A and 4B, the icon repository file 482*a-n* may be part of an Icon Manager (not shown). The Icon Manager may track the reference count of each path in progress, so it can be similar to what is present in the iconizer 484*a-n*.

Unicode Filenames

Within Unicode, some characters—notably those with diatrical marks—can be represented in 2 forms: Normal Form Composed (NFC) or Normal Form Decomposed (NFD). A string of Unicode characters can contain any mixture of both forms (Note that this is explicitly excluding the compatibility normal forms namely NFKC and NFKD because they are not relevant to this discussion).

| Character | NFC | NFD | |
|---|---|---|---|
| Á | Á | A | ´ |
| (codepoint) | 00C1 | 0041 | 0301 |

Because there are 2 forms for representing (some) characters in Unicode, it's possible to produce different sequences of codepoints meaning to indicate the same sequence of characters. Hence, some embodiments of the cloud-based platform may end up with more than one way to specify the same path.

The following table specifies behavior of all platforms related to handling of Unicode filenames:

| Platform | Accepts | Returns |
|---|---|---|
| Mac | All | NFD |
| Windows | All | Input |
| Linux | All | Input |
| cloud-based platform (e.g., Box) | All | Input |

In some embodiments there may be two issues:

1. Some embodiments cannot generally depend on the OS to give back the exact filename that it was given.

```
>>> from _future_ import unicode_literals
>>> import sys
>>> sys.platform
'darwin'                        ← Mac
>>> name1 = 'Á'
>>> name1
a'\xcl'                         ← NFC
>>> import os
>>> os.mkdir(name1)
>>> os.listdir('.')
[u'A\u0301']                    ← NFD
```

2. A broader issue though is that because the same filename may be encoded in different codepoints, there can be 2 files in a directory on the remote cloud-based platform or the local Windows that represent the same name, but not on Mac.

```
>>> from _future_ import unicode_literals
>>> import sys
>>> sys.platform
'win32'                         ← Windows
```

```
>>> name1 = 'Á'
>>> name1
a'\xcl'                         ← NFC
>>> import os
>>> os.mkdir(name1)
>>> os.listdir('.')
[a'\xcl']
>>> name2 = 'Á'
>>> name2
u'A\u0301'                      ← NFD
>>> os.mkdir(name2)
>>> os.listdir('.')
[u'A\u0301', u'\xcl']
>>> from _future_ import unicode_literals
>>> import sys
>>> sys.platform
'darwin'                        ← Mac
>>> name1 = 'Á'
>>> name1
a'\xcl'                         ← NFC
>>> import os
>>> os.mkdir(name1)
>>> os.listdir('.')
[u'A\u0301']                    ← NFD
>>> name2 = 'Á'
>>> name2
u'A\u0301'
>>> os.mkdir(name2)
Traceback (most recent cell last):
  File "<stdin>", line 1, in <module>
OSError: [Errno 17] File exists: 'A\xcc\xB1'
```

Accordingly in some embodiments, the sync client may need to be able to sync files between the local platform and the cloud-based platform with names in any normal form.

Some embodiments do not restrict filenames to either NFC or NFD because what would require renaming all of existing files and folders, update all other clients (iOS, Android, etc.) and change the server side to reject non-conforming names.

Design

In some embodiments, the name of an item stored in the Local Shadow Item Store and Last Sync Item Store should reflect the name of the item on disk. In some embodiments, this means that all local operations that affect an item's name (Create, Rename, Move) should re-read the name from disk. This would solve the first issue identified above.

The second issue presented in some embodiments is an artifact of a platform (Mac) not supporting all capabilities provided by cloud-based platform. It can be considered similar to the cloud-based platform's ability to have multiple folders at the top-level with the same name due to collaborations. There are two possible solutions to this issue in some embodiments:

Fail the second item encountered and mark it as a Problem Item.

Sync the second item encountered locally with a different name.

Solution 1 may be a simpler implementation to an uncommon scenario. But it may provide a sub-optimal user experience. The failure to sync the item may be remote logged by the sync client.

Solution 2 may generally provide a much better user experience. The operation for the second item may fail with DestinationExistsError and be handled by the ConflictRecoveryManager in some embodiments. The ConflictRecoveryManager can rename the first item locally (which will in-turn cause the corresponding item on the cloud-based platform to be renamed) and retry the operation for the second item. In order to not rename the first item on the remote cloud-based platform in some embodiments, the conflict recover logic can be be changed to retry the failed operation for the second item with a different name.

Additional Considerations

Unit tests for the LocalFSSyncAPI can be written to ensure that the names stored in the Local Shadow Item Store and Last Sync Item Store reflect the disk names. In addition, B-Y tests can be written for this.

B-Y tests can be written to test the scenario of 2 files with the same name but different encodings.

Example Test Cases

1. Create a directory with NFC normalized name on the cloud-based platform and let it sync locally. Test that no echo back changes are made on the cloud-based platform. Make changes to the directory locally and test that they are synced to the cloud-based platform. Make changes to the directory on the cloud-based platform and test that they are synced locally.
2. Repeat 1 with NFD normalized name.
3. Repeat 1 using a file instead of a directory.
4. Repeat 2 using a file instead of a directory.
5. Create a directory with NFC normalized name on the cloud-based platform and let is sync locally. Change local monitor to full scan mode and test that no changes are made on the cloud-based platform.
6. Repeat 5 with NFD normalized name.
7. Repeat 5 using a file instead of a directory.
8. Repeat 6 using a file instead of a directory.
9. Create a directory with NFC name on the cloud-based platform and let it sync locally. Then create another directory with the same name but NFD normalized in the same directory on the cloud-based platform. Test that—
 a. On Windows, the second directory syncs
 b. On Mac, either the second directory fails to sync and is marked as problem (Solution #1) or the second directory is synced with a different name and the first directory is not modified (Solution #2).
10. Repeat 9 reversing the order of NFC and NFD normalization.
11. Repeat 9 using files instead of directories.
12. Repeat 10 using files instead of directories.
13. Repeat 9 and 10 with one file and one directory.

Example Client—Side System

FIG. 5 depicts a block diagram illustrating an example device system 500 showing select components described in relation to FIGS. 1-4B on the client side (e.g., devices 102 as shown FIG. 1) of the cloud-based platform.

Device 500 may include, for example, a bus 502, and a memory 504 among other components. The memory 504 may include, among others, a synchronization client 580 (e.g. similar to synchronization client 480a-n as described in FIGS. 4A-4B), which may include a file system monitor 590, an icon repository file 582, and iconizer 584. The file system monitor 590 may include a raw event processor 592 and an event filter pipeline 594. The raw event processor may include a listener 592a, a full scanner 592b, and a partial scanner 592C. The event filter pipeline 594 may include one or more event filters 594a, and an event buffer 594b. The memory 504 may also include a communication module 506 that facilitates communication among the mobile device 500, the host server 100, and other components discussed herein using any of the communication protocols that are supported. The memory 504 may also include other device modules (not shown in FIG. 5 for simplicity) such as a GPS module for determining and providing location information, text input module for accepting and processing inputs provided using different input mechanisms of the mobile device, and the like for handling various functions of the mobile device 500. It is noted that the aforementioned modules are intended for purposes of enabling the present embodiments, rather than limiting. As such, a person of ordinary skill in the art will understand that the present disclosure covers apparent alternatives, modifications, and equivalents (e.g., combining or separating the modules) made to the techniques described herein. Additional or less components/modules/engines can be included in the mobile device 500 and each illustrated component.

As used herein, a "module," "a manager," an "interface," or an "engine" includes a general purpose, dedicated or shared processor and, typically, firmware or software modules that are executed by the processor. Depending upon implementation-specific or other considerations, the module, manager, interface, or engine can be centralized or its functionality distributed. The module, manager, interface, or engine can include general or special purpose hardware, firmware, or software embodied in a computer-readable (storage) medium for execution by the processor. As used herein, a computer-readable medium or computer-readable storage medium is intended to include all media that are statutory (e.g., in the United States, under 35 U.S.C. § 101), and to specifically exclude all media that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The bus 502 is a subsystem for transferring data between the components of the mobile device 500. For example, the bus 502 may facilitate the transfer of data between the memory 504 and other components of the mobile device such as the processor and/or the input/output components that utilize the data.

As previously mentioned, over all, the present embodiments may provide shell icon communications via a synchronization client 580, iconizer 584 and icon repository file 582.

According to some embodiments of the present disclosure, during normal operations, the synchronization client 580 may operate in one or both of two modes to gather file/folder synchronization events from host server 100. When in a listening mode, a listener module 592a (e.g., as a thread running in the operating system of device 500) may receive new events reported from the host server 100 as these events occur, and the raw event processor 592 may process these events in manners described herein. During a startup phase of the synchronization client 580, or when there is an inconsistency (e.g., resulted from a potential violation of local file system rules), the synchronization client 580 may switch into a full scan mode, in which the full scanner 592b may request that all existing files and folders, for example, be retrieved from the workspace 302 (e.g., in host server 100) and turned into events.

According to some embodiments, the raw event processor 592 may receive events from the host server 100 which represent that a modification to an item (e.g., a file or a folder) has taken place on the workspace 302, and may function together with other components to process the received raw events, such as the generating of the aforementioned icon repository file 582.

According to some embodiments, the file system monitor 590 may cause the sync client 580 to receive (e.g., using the listener 592*a*) or to retrieve (e.g., using the full scanner 592*b*) events from the workspace 302 and to normalize those events so that the events may be input into the icon repository file 582 correctly. The file system monitor 590 may operate multiple processes to, for example, receive raw events with the listener 592*a*, retrieve events with the full scanner 592*b*, generate synchronization steps with the event processor 592, normalize events with the event filter pipeline 594, and control the operating status of the file system monitor 590 itself by responding to start, stop, pause, and resume, as well as transitioning between the aforementioned listen and full scan mode.

According to some embodiments, after an event indicating a modification to an item is received from the host server 100, the file system monitor 590 may initiate the event's processing by requesting the raw event processor 592 (e.g., the full scanner 592*b* or the listener 592*a*) to send that event through the event filter pipeline 594. Then, the event filter pipeline 594 may utilize one or more filters in the event filters 594*a* to identify whether execution of the event can cause violation of any local file system rule. Examples of these local file system rules can include: (1) an item cannot be added to a folder that does not exist; (2) no two items in the same folder can have the same name; and/or (3) a non-empty folder cannot be deleted. If the execution of the event can cause violation of any rule, the event filter pipeline can buffer the event in the event buffer 786 until a subsequent event arrives. The event filter pipeline 594 may then identify whether execution of an aggregate of the events is to violate any local file system rule. If the execution of the aggregate of the events is to violate any rule, the event filter pipeline 594 may continue to buffer the subsequent event until another subsequent event arrives. Additionally, in some implementations, if an event remains buffered in the event filter pipeline 594 for longer than a configurable maximum time limit, the event filter pipeline 594 may drop the event, and some embodiments of the synchronization client 580 may report (e.g., via the full scanner 592*b*) that a full scan of file/folder status within the synchronization scope is required to resolve the inconsistency.

The event filter pipeline 594 in the file system monitor 590 may be responsible for normalizing raw events received from the cloud-based platform (e.g., workspace 302 through host server 100) into synchronization event (or synchronization steps) that are safe to apply on the local file system where the synchronization client 580 operates or to apply as repository entries into icon repository file 582. Because the cloud-based platform (e.g., workspace 302) may not provide any ordering guarantees around the delivery of events, the event filter pipeline 594 may perform the guaranteeing that, for example, a given raw event received which represents a future state of the associated item is not applied until the item can be moved into that state without violating any local file system rules. Accordingly, because iconizer 584 may be dependent on updates to the icon repository file 582 created and modified by sync client 580, the icons for files/folders generated by iconizer 584 may provide to a user true real-time communications regarding the state of locally stored files/folders with respect to work items in a given workspace (e.g. workspace 302).

Some embodiments of the event filter pipeline 594 may treat each raw event in the cloud-based platform as a state update notification for a specific item (e.g., a file or a folder). Each raw event (which is to pass through the event filter pipeline 594 may include, in some examples, the full state of the item affected by the event. This state information may be incorporated in real time into icon repository file 582 as previously discussed.

According to some embodiments, the event filter pipeline 594 then can compare the state of the item as indicated by the event against the current state of that item as stored on the local mobile device 500. The comparison may be used to determine whether the received event represents a newer version of the item, whether the newer state in the event is currently valid, and/or which synchronization steps need to be generated to move the item from its current state on the mobile device 500 to its newer state in the event, for example including updating icon repository file 582.

In addition, the event filter pipeline 594 can include one or more of the following example filter components in the event filters 594*a* in order to carry out the functionalities of the event filter pipeline 594 described herein:

A. Raw Retrieve Shadow Item Filter

The raw retrieve shadow item filter can retrieve the current state of the item affected by the event from (e.g., a local storage of) the local mobile device 500. This current item state can be used, for example, to update the icon repository file 582.

B. Drop Duplicate Raw Events Filter

The drop duplicate raw events filter can compare a Sequence_ID in the event item state with a Sequence_ID in the current item state to determine if the event item state is newer. In some embodiments, the drop duplicate raw events filter can drop the event if the event represents an older state of the item. In one or more embodiments, however, this check can be skipped for events originating from either the full scanner 592B or a partial scanner 592C since (a) events from the scanners are typically guaranteed to represent the current state of the item; and (b) the scanners detect item deletions through the absence of the item in the scan result, and therefore the scanners typically do not have access to an updated Sequence_ID for deletion events.

C. Folder Sync and Unsync Filter

The folder synchronization and unsynchronization filter can determine whether the received event represents a folder synchronization/unsynchronization. If the event does represent so, the event filters 594A indicates to the file system monitor 590 that a partial scan is required for the specified folder.

D. File System Conflict Filter

The local file system conflict filter can check if the event item state is consistent with the current state(s) of the rest of the local items based on local file system rules. Examples of these local file system rules can include: (1) an item cannot be added to a folder that does not exist; (2) no two items in the same folder can have the same name; and/or (3) a non-empty folder cannot be deleted. So, if the event item state indicates that the item is not deleted, the local file system conflict filter can check that the item's parent folder exists and that there is no other item with the same name in that folder. If the event item state indicates that the item is deleted and the item is a folder, the local file system conflict filter can check that the folder is empty. If any of these checks fails, the item event is buffered until the checks can pass (e.g., upon receiving further events).

E. Raw Event to Sync Event Filter

The raw event to synchronization event (or synchronization step) filter can generate the synchronization steps or synchronization events necessary to transform the item from the shadow item state to the event item state based on the differences between the shadow item state and the event item state. In some embodiments, this filter can also update the current state of the item with the new state of the item.

The event filter pipeline 594 may also include an event buffer 594*b* to buffer events. For example, in some particular implementations, a move event can be recorded by the local listener 592*a* as a delete event followed quickly by a create event. The event buffer 594*b* may buffer the delete event for a small amount of time and attempts to resolve it with a create event. Events can be held in the buffer until either the event resolves (e.g., when the filter pipeline 594 receives another event process operation) or until a buffer time expires (e.g., at which point the filter pipeline 594 may execute a flush buffer operation). According to some embodiments, buffering of an event by event buffer 594*b* may cause the sync client 580 to enter a status of "in-progress" for the particular work item in icon repository file 582.

In this way, the disclosed techniques of the sync client 580 may monitor conditions of events in the cloud-based platform, create and update an icon repository file 582, of which an iconizer 584 may monitor in which to provide shell icon communications indicating the state of file/folder stored locally at device 500. In addition, the sync client 580 may bring the benefit of resilience to out of order events so as to minimize unnecessary full scans and to provide support for lock/unlock and collaboration/uncollaboration events in the cloud-based platform.

Among other benefits, the disclosed embodiments may bring the benefit of extensibility, maintainability, and testability. For extensibility, the disclosed embodiments can be extensible to handle any additional modes of generating new events, more complicated methods of normalizing events, and more complicated transitions and inconsistency handling. For maintainability, the disclosed embodiments can be easily maintained because modularization. Additionally, minor changes to execution logic do not require substantial changes to the design. For testability, each component can be tested individually, as well as the control mechanisms, in a single threaded manner. Further, multithreaded integration tests can be easily performed and designed as well.

Additional Background Information

Figure 8:
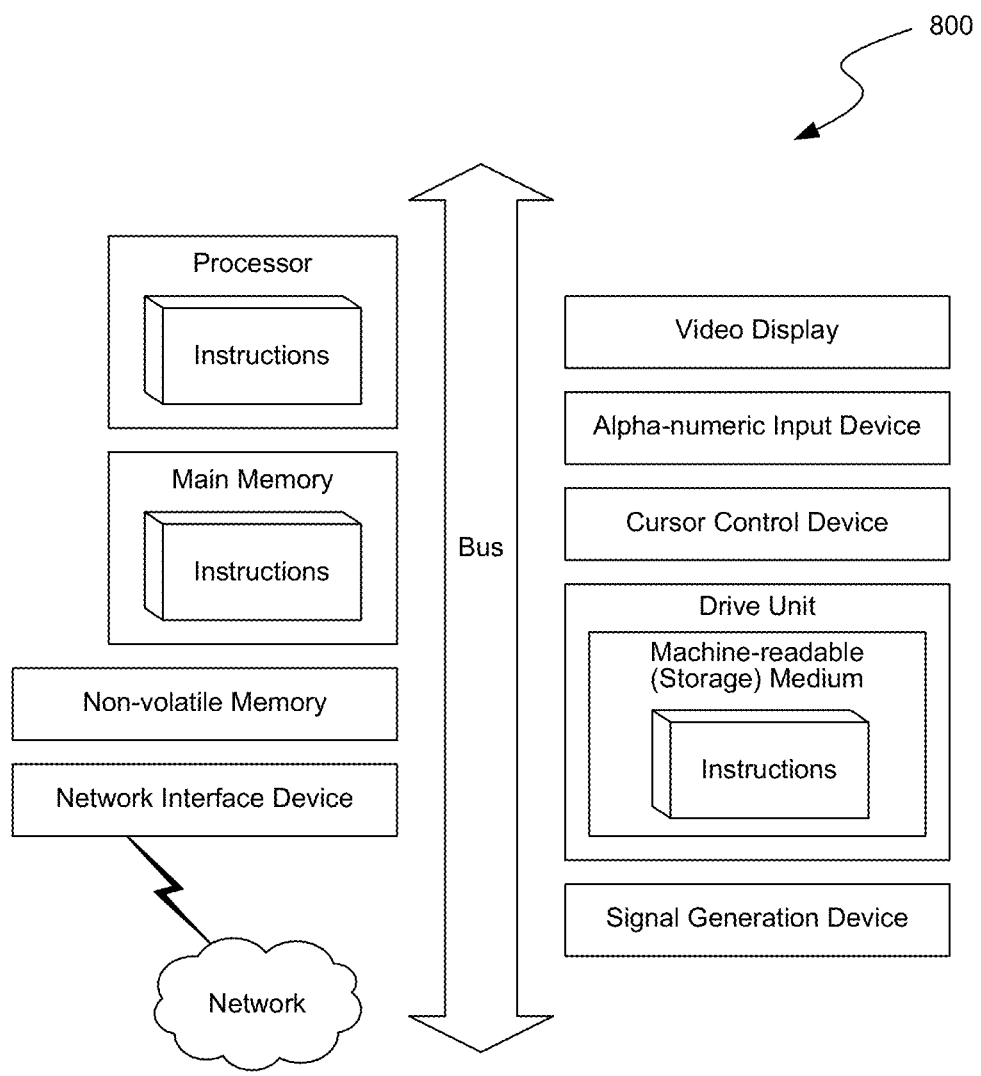
FIG. 8 depicts a diagrammatic representation of a machine in the example form of a computer system within which a set of instructions, for causing the machine to perform any one or more of the methodologies discussed herein, may be executed.

FIG. 8 shows a diagrammatic representation 800 of a machine in the example form of a computer system within which a set of instructions, for causing the machine to perform any one or more of the methodologies discussed herein, can be executed.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a user device, a tablet, a phablet, a laptop computer, a set-top box (STB), a personal digital assistant (PDA), a thin-client device, a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed repository, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 2800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Additional Remarks

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the disclosure provided herein can be applied to other systems, not necessarily the system described above. The elements and acts of the various embodiments described above can be combined to provide further embodiments.

Any patents and applications and other references noted, including any that can be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes some embodiments of the disclosure, and describes the best mode contemplated, no matter how detailed the above appears in text, the teachings can be practiced in many ways. Details of the system can vary considerably in its implementation details, while still being encompassed by the subject matter disclosed herein. As noted above, particular terminology used when describing some features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While some aspects of the disclosure may be presented herein in some claim forms, the inventors contemplate the various aspects of the disclosure in any number of claim forms. For example, while only one aspect of the disclosure is recited as a means-plus-function claim under 35 U.S.C. § 112(f), other aspects can likewise be embodied as a means-plus-function claim, or in other forms, such as being embodied in a computer-readable medium. (Any claims intended to be treated under 35 U.S.C. § 112(f) will begin with the words "means for".) Accordingly, the applicant reserves the right to add additional claims after filing the application to pursue such additional claim forms for other aspects of the disclosure.

What is claimed is:

1. A method for displaying a graphical icon representative of a state of a local copy of a shared item, the shared item stored in a workspace hosted by a cloud-based collaboration platform, the shared item shared with a plurality of collaborators via the workspace, the local copy of the shared item stored on a client device with a synchronization client, the synchronization client configured to enable synchronization between the shared item in the workspace and the local copy of the shared item at the client device, the method comprising:

detecting a change in an icon repository file from a first state to a second state, the change including a creation or a modification of an entry that is associated with the local copy of the shared item, wherein the entry comprises a value indicative of a version of the entry and a value indicative of a synchronization state of the local copy of the shared item, and wherein the icon repository file is stored at the client device and automatically updated by the synchronization client in response to events received from the cloud-based collaboration platform, the received events indicative of modifications to one or more shared items stored in the workspace:

in response to the detected change, comparing the value indicative of the version of the entry as it exists in the first state of the icon repository file to the value indicative of the version of the entry as it exists in the second state of the icon repository file;

in determining the value indicative of the version of the entry as it exists in the first state of the icon repository file is different than the value indicative of the version of the entry as it exists in the second state of the icon repository file, identifying the value indicative of the synchronization state of the local copy of the shared item as it appears in the second state of the icon repository file;

generating a first graphical icon representative of the synchronization state of the local copy of the shared item, based on the value indicative of the synchronization state of the local copy of the shared item as it appears in the second state of the icon repository file; and causing display, via a graphical user interface (GUI) of the client device, of the first graphical icon representative of the synchronization state of the local copy of the shared item.

2. The method of claim 1, further comprising: if the value indicative of the version of the entry as it exists in the first state of the icon repository file is the same as the value indicative of the version of the entry as it exists in the second state, ignoring the entry; and continuing to display a second graphical icon representative of the synchronization state of the local copy of the shared item.

3. The method of claim 1, wherein if the icon repository file is not detected, displaying no graphical icons.

4. The method of claim 1, wherein the value indicative of the synchronization state of the local copy of the shared item is selected from the group consisting of: synchronized, unsynchronized, in-progress, hidden, and problem.

5. The method of claim 1, wherein the value indicative of the version of the entry is a 64-bit unsigned integer.

6. The method of claim 1, wherein the first state of the icon repository file corresponds with a first synchronization state of the workspace and the second state of the repository file corresponds with a second synchronization state of the workspace.

7. The method of claim 1, wherein the entry in the icon repository file further comprises a value indicative of a traits tag.

8. The method of claim 7, further comprising: if the value indicative of the version of the entry as it exists in the first state of the icon repository file is different than the value indicating the version of the entry as it exists in the second state of the icon repository file, identifying the value indicative of the traits tag of the local copy of the shared item as it appears in the second state of the icon repository file;

generating a third graphical icon representative of the synchronization state of the local copy of the shared item, based on the value indicative of the traits tag of the local copy of the shared item as it appears in the second state of the icon repository file;

causing display of the third graphical icon representative of the state of the local copy of the shared item; and modifying a file permission to comply with the traits tag of the local copy of the shared item.

9. The method of claim 7, wherein the value indicative of the traits tag of the local coy of the shared item is selected from the group consisting of: locked, unlocked, and collaborating.

10. The method of claim 1, wherein the entry in the icon repository file further comprises a value indicative of a file path, the value indicative of the file path comprising a Normal Form Composed (NFC) or Normal Form Decomposed (NFD) file name.

11. A method for informing an iconizer at a client device of a change in status of a shared item stored in a workspace of a cloud-based collaboration platform using an icon repository file stored at the client device, the icon repository file monitored by the iconizer and updated by a synchronization client at the client device, the shared item being shared with a plurality of collaborators via the workspace, the synchronization client configured to enable synchronization between the shared item in the workspace and a local copy of the shared item at the client device, the method comprising:

detecting, by the synchronization client, an event received from the cloud-based collaboration platform, the event indicative of a modification to the shared item or the local copy of the shared item;

creating or modifying automatically, by the synchronization client, an entry in the icon repository file, in response to detecting the event, the entry corresponding to the local copy of the shared item, wherein the entry comprises a value indicative of a version of the entry and a value indicative of a synchronization state of the local copy of the shared item corresponding to the entry, wherein the creation or modification of the entry is detectable by the iconizer;

incrementing, by the synchronization client, the value indicative of the version of the of the entry; and setting, by the synchronization client, the value indicative of the synchronization state of the local copy of the shared item based on the event;

wherein the value indicative of the synchronization state of the local copy of the shared item is utilized by the iconizer to generate and display a graphical icon representative of the synchronization state of the local copy of the shared item.

12. The method of claim 11, further comprising: detecting an event indicative of synchronization of the shared item with the local copy of the shared item; incrementing the value indicative of the version of the of the entry; and setting the value indicative of the synchronization state of the local copy of the shared item to synchronized.

13. The method of claim 12, further comprising: counting a number of synchronized entries, the synchronized entries being those in which the value indicative of the synchronization state of the local copy of the shared item is set to synchronized; deleting the synchronized entries when the number of synchronized entries reaches a threshold number; and resetting the number of synchronized entries.

14. A machine readable medium having stored thereon instructions which, when executed by a processor on a client device, cause the processor to:

detect a change in an icon repository file from a first state to a second state, the change including a creation or a modification of an entry that is associated with a local copy of a shared item, wherein the shared item is stored in a workspace hosted by a cloud-based collaboration platform and shared with a plurality of collaborators via the workspace, the local copy of the shared item stored at the client device, the client device including a synchronization client configured to enable synchronization between the shared item in the workspace and the local copy of the shared item at the client, wherein the entry comprises a value indicative of a version of the entry and a value indicative of a synchronization state of the local copy of the shared item, and wherein the icon repository file is stored at the client device and automatically updated by the synchronization client in response to events received from the cloud-based collaboration platform, the received events indicative of modifications to one or more shared items stored in the workspace;

in response to the detected change, compare the value indicative of the version of the entry as it exists in the first state of the icon repository file to the value indicative of the version of the entry as it exists in the second state of the icon repository file;

in determining the value indicative of the version of the entry as it exists in the first state of the icon repository file is different than the value indicative of the version of the entry as it exists in the second state of the icon repository file, identify the value indicative of the synchronization state of the local copy of the shared item as it appears in the second state of the icon repository file;

generate a first graphical icon representative of the synchronization state of the local copy of the shared item, based on the value indicative of the synchronization state of the local copy of the shared item as it appears in the second state of the icon repository file; and cause display, via a graphical user interface (GUI) of the client device, of the first graphical icon representative of the synchronization state of the local copy of the shared item.

15. The machine readable medium of claim 14, wherein if the value indicative of the version of the entry as it exists in the first state of the icon repository file is the same as the value indicative of the version of the entry as it exists in the second state of the icon repository file, the processor is further caused to: ignore the entry; and continue to display a second graphical icon representative of the synchronization state of the local copy of the shared item.

16. A client device for accessing, viewing, and/or modifying a local copy of a shared item, the shared item stored in a workspace hosted by a cloud-based collaboration platform, the shared item shared with a plurality of collaborators via the workspace, the local copy of the shared item stored on the client device, the device comprising:

a processor;
a display device;
a network interface; and
a memory unit having stored thereon:
an icon repository file;
a synchronization client configured to enable synchronization between the shared item in the workspace and the local copy of the shared item at the client device, the synchronization client including instructions which, when executed by the processor, cause the client device to:
detect, via the network interface, an event in the workspace hosted by the cloud-based collaboration platform indicative of a modification to the shared item or the local copy of the shared item;
create or modify automatically an entry in the icon repository file, in response to detecting the event, the entry corresponding to the local copy of the shared item, wherein the entry comprises a value indicative of a version of the entry and a value indicative of a synchronization state of the local copy of the shared item corresponding to the entry, increment the value indicative of the version of the of the entry; and
set the value indicative of the synchronization state of the local copy of the shared item based on the event; and
an iconizer including instructions which, when executed by the processor, cause the client device to:
detect the increment by the synchronization client of the value indicative of the version of the entry, in response to the detected increment, identify the value indicative of the synchronization state of the local copy of the shared item;
generate a first graphical icon representative of the synchronization state of the local copy of the shared item based on the value indicative of the synchronization state of the local copy of the shared item; and
display, via the display device, the first graphical icon representative of the synchronization state of the local copy of the shared item.

17. The client device of claim 16, wherein the synchronization client further comprises instructions which, when executed by the processor, further cause the client device to: detect, via the network interface, an event in the workspace hosted by the cloud-based collaboration platform indicative of the synchronization of the shared item with the local copy of the shared item; increment the value indicative of the version of the entry; and set the value indicative of the synchronization state of the local copy of the shared item to synchronized.

18. The client device of claim 16, wherein the synchronization client further comprises instructions which, when executed by the processor, further cause the client device to: count a number of synchronized entries, the synchronized entries being those in which the value indicative of the synchronization state of the local copy of the shared item is set to synchronized; delete the synchronized entries when the number of synchronized entries reaches a threshold number; and reset the number of synchronized entries.

19. The client device of claim 16, wherein the synchronization client further comprises instructions which, when executed by the processor, further cause the client device to: detect, via the network interface, an event in the workspace hosted by the cloud-based collaboration platform indicative of a traits flag of the shared item; modify the entry in the icon repository file, wherein the entry further comprises a value indicative of the traits flag; increment the value indicative of the version of the entry; set the value indicative of the traits flag to one from the group consisting of: locked, unlocked, and collaborating; and set a file permission to reflect the set value indicative of the traits flag.

20. The client device of claim 19, wherein the iconizer further comprises instructions which, when executed by the processor, further cause the client device to: detect the increment by the synchronization client of the value indicative of the version of the entry; identify the value indicative of the traits flag of the local copy of the shared item in response to the detected increment; generate a second graphical icon representative of the synchronization state of the local copy of the shared item based on the value indicative of the traits flag of the local copy of the shared item; and display, via the display device, the second graphical icon representative of the synchronization state of the local copy of the shared item.

* * * * *